United States Patent [19]
Steinberg

[11] 3,829,841
[45] Aug. 13, 1974

[54] COMPUTER MONITORING DEVICE

[75] Inventor: William Steinberg, Waterloo, Ontario, Canada

[73] Assignee: Computer Performance Instrumentation Incorporated, Kitchener, Ontario, Canada

[22] Filed: Dec. 8, 1972

[21] Appl. No.: 313,606

[52] U.S. Cl. .......... 340/172.5
[51] Int. Cl. .......... G06f 11/00
[58] Field of Search .......... 340/172.5

[56] References Cited

UNITED STATES PATENTS

| | | | |
|---|---|---|---|
| 3,045,211 | 7/1962 | Auerbach | 340/172.5 |
| 3,156,815 | 11/1964 | Smeltzer | 340/172.5 |
| 3,428,793 | 2/1969 | Scuitto | 340/172.5 |
| 3,564,510 | 2/1971 | Bagley et al. | 340/172.5 |
| 3,702,989 | 11/1972 | Provenzano, Jr. et al. | 340/172.5 |

*Primary Examiner*—Gareth D. Shaw
*Attorney, Agent, or Firm*—Rogers, Bereskin & Parr

[57] ABSTRACT

A device for generating a histogram from a varying digital input word and for displaying the histogram as a series of vertical segments on a television monitor. The input word may be any word existing in a computer, e.g. it may be the program counter, thus to produce a histogram showing the frequency of occurrence of addresses of instructions used by the computer. The device includes a memory having a number of discrete memory addresses. One or more input words are assigned to each memory address, as preset by base address and resolution controls, and each time such word or words occur, the memory location at that address is incremented to produce a histogram.

To display on a television monitor the histogram in memory, an X-axis position counter produces a series of counts during each horizontal scan of the monitor beam, to address successive memory locations during counting, so that each count corresponds to one memory location and also to a discrete X-axis position of the beam. A Y-axis position counter generates a count representing the Y-axis position of the beam. For each X-axis position, the content of the memory location associated therewith is read into a comparison circuit and compared with the Y-axis beam position. If the memory content of the addressed location is sufficiently great relative to the beam Y-axis position, the comparison circuit produces a pulse used to create a spot on the screen at the X and Y coordinates in question, so that as scanning progresses, the histogram segments are traced out on the screen.

22 Claims, 25 Drawing Figures

PATENTED AUG 13 1974 SHEET 06 OF 12 3,829,841

COMPUTER MONITORING DEVICE

This invention relates to a device for generating a histogram from a varying digital input signal. In a preferred embodiment the invention relates to a device which can monitor rapidly changing digital data in a computer installation and which can generate a histogram from such data, the histogram having adjustable boundaries and resolution. In another of its aspects, the invention provides means for displaying the histogram in a simple and easy to use form.

The cost of manufacturing, installing and operating large computer installations requires that these installations be used as efficiently as possible. The operation of inefficient user programs on the installation can result in substantial financial loss to the user and/or owner of the installation. Use of inefficient supervisory or systems programs may also result in loss, since less time is then available for the execution of user programs, which are the ultimate justification for the installation. Therefore, the performance of the computer installation should be monitored to ensure non-wasteful usage, and also to ensure that troubles in the installation are corrected as soon as possible.

The means existing at the present time to monitor computer performance in real time are, so far as is known, inadequate. Devices have been constructed which sample selected signals from the operating hardware of the computer installation and indicate the status of the signals via meters. This is useful when measurements occur over relatively long periods of time, but such devices cannot cope with rapidly changing data, and in addition the interpretation of data obtained in this manner requires a high degree of sophistication on the part of the user.

An alternate approach presently used is to employ programs resident within the computer memory to interrogate the system at various times and to provide indications of the results. This technique requires for its operation expensive system resources (such as memory space) which could be used for user programs. In addition, the collection of data is relatively slow, and there is usually a serious delay between the time when the monitoring program is activated and the time when the data is available.

Accordingly, it is an object of the present invention, in a preferred aspect, to provide a device which is self-contained (i.e. it does not require any system resources for its operation) and which can sample data from a computer installation in real time at a speed approaching that of the computer installation itself and which stores the sample information in an easy to interpret form, namely that of a histogram. In the preferred embodiment the boundaries (i.e. the upper and lower limits) and the resolution of the histogram are adjustable for flexibility of use, so that a large amount of data can be viewed with low resolution, or smaller amount of data can be examined at a higher resolution.

In another of its aspects, the invention provides a television monitor, and circuits for displaying the histogram as a series of spaced segments on the television monitor. In a preferred embodiment, the number of discrete quantities contained in the histogram to be displayed is greater than the number of segments that can be displayed on the television screen, and therefore means are provided to shift the display so that the entire set of quantities of the histogram can be viewed. In a preferred embodiment a cursor is displayed on the television monitor screen, the position of the cursor being adjustable to place the cursor below any desired segment of the histogram. Also in the preferred embodiment, means ar provided for displaying on the television screen identifying information relating to the histogram segment below which the cursor is positioned.

Further objects and advantages of the invention will appear from the following description, taken together with the accompanying drawings, in which.

GENERAL DESCRIPTION

Figure 1:
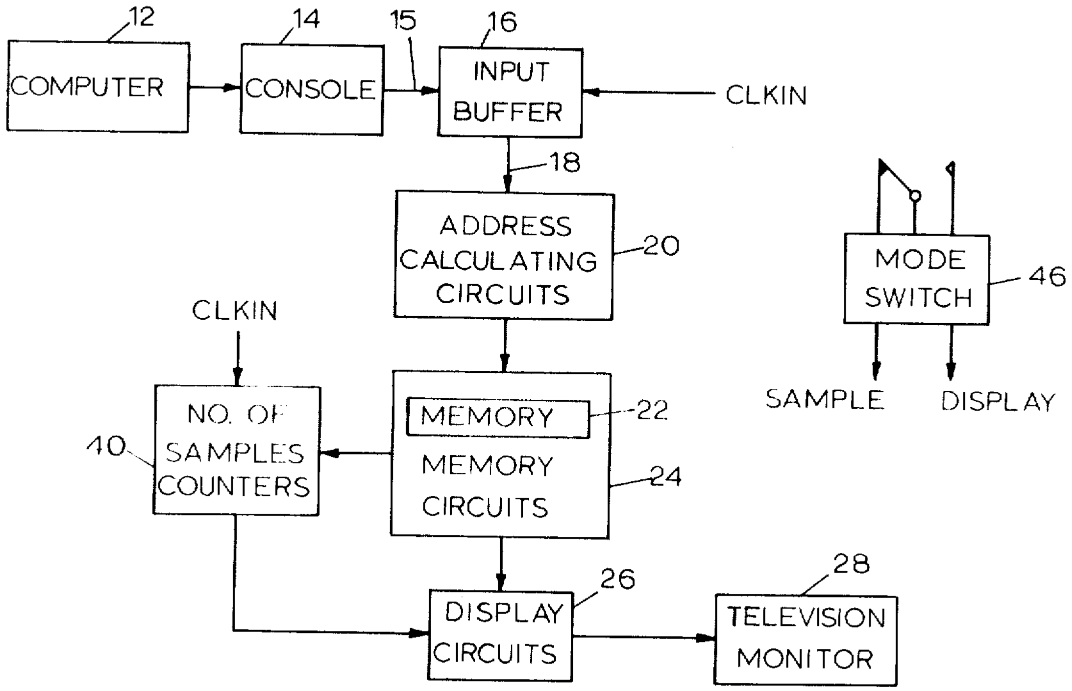
FIG. 1 is a block diagram of a complete system according to the invention.

Reference is first made to FIG. 1, which is a block diagram of a typical system according to the invention. FIG. 1 shows a computer installation 12 which is to be monitored. The monitoring is carried out according to the invention by sampling data in the form of a data word from the computer 12. The data word sampled can be any data word existing in the computer 12, the particular word selected depending on the purpose of the monitoring. For example, IBM System 360 computers contain a program status word or PSW, which is a 64 bit word containing substantially complete information of the status of the central processing unit (CPU). The PSW contains a word called the instruction counter, which is the address of the next instruction to be used by the machine. By sampling the instruction counter at frequent intervals, it can be determined where in its memory core the computer is operating; for example, if the computer goes into a loop, certain addresses will appear more frequently.

Alternatively, instead of sampling the contents of the instruction counter (which may only contain coding for the addresses to be used), the contents of the storage address register of the computer may be sampled to determine the frequency of occurrence of each actual address used by the computer. As another alternative the actual instructions used by the computer can be sampled instead of sampling only the addresses of the instructions. In IBM System 360 computers, this is accomplished by sampling the I-OP signal, which is the signal containing the instructions used by the computer. Indeed, any binary word of interest in the computer may be sampled.

Normally all computer installations include a console, shown at 14 in FIG. 1, and all the signals of interest in the computer are usually available at the console. Therefore, according to a preferred embodiment of the invention leads 15 are connected to buffered areas such as the console 14 lamp drivers to obtain the data word of interest and to conduct this word to the inputs of an input buffer 16. The input buffer 16 is supplied with cloc pulses CLKIN to gate the input word (which changes at frequent intervals as the computer operates) at periodic intervals into the input buffer.

Once a sample of the input data word is placed in the input buffer, the sample is directed via leads 18 to address calculating circuits 20. Circuits 20 calculate a memory address for each sampled input word (provided that the word is in a desired range — words outside the range are rejected). Circuits 20 then increment a location in a memory 22 (which forms part of memory circuits 24) at the memory address calculated for the sampled input word.

The result of this is that at the end of the sampling process the memory 22 contains a histogram. In the histogram each memory address or location corresponds to an input word (or group of input words), and the content of that memory location represents the number of times the input word (or words) assigned to that location occurred.

Figure 2:
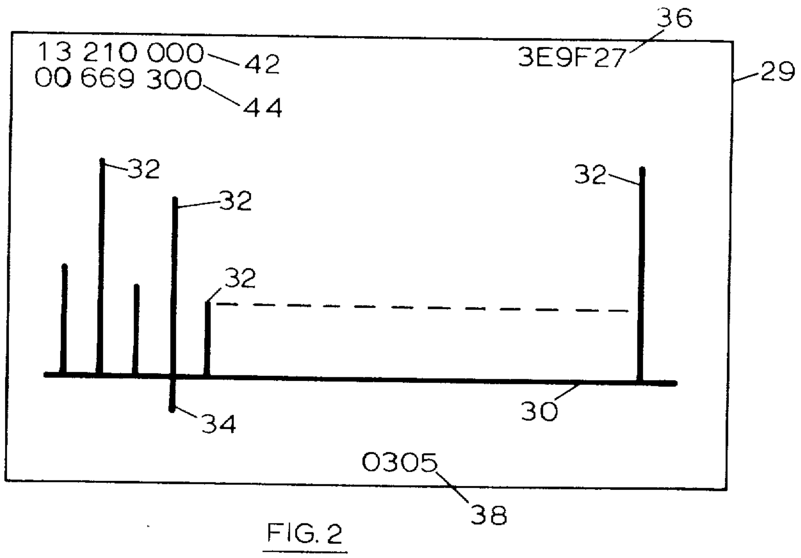
FIG. 2 shows the screen of a television monitor with a histogram according to the invention displayed thereon.

The contents of the memory 22 are read out into display circuits 26, which generate video signals appropriate to display the histogram on a television monitor 28. FIG. 2 shows the screen 29 of the monitor 28 with a typical histogram displayed thereon. The FIG. 2 display includes a baseline 30 and a number of vertical segments 32 positioned above the baseline. Each segment 32 corresponds to one memory address, and the height of the segment represents the contents of that memory address. If a segment is high, this indicates that the input word (or words) associated with the memory address for that segment has occurred many times (this can show, for example, that an inefficient instruction is being executed frequently and that an alternative more efficient instruction is being used infrequently).

In order to identify segments of interest, a cursor 34 is generated by the display circuits 26. The cursor 34 is a vertical line located below the baseline 30, and the display circuits allow the cursor to be moved to the left or right to be positioned beneath any desired vertical segment. When the cursor 34 is positioned below a desired vertical segment, the display circuits 26 generate a character display 36 representing the particular input word (or group of input words) giving rise to that segment, and also generate a character display 38 indicating the number of time that input word (or words) has occurred.

The address calculating circuits 20 can be set to assign memory addresses only for a selected range of input words and to reject all input words outside the range. This is useful when, for example, it is known that a supervisory program operates with a certain range of input words in which case circuits 20 may be set so that only words in that range are accepted by the memory 22. By counting the number of input words accepted by the memory and comparing this number with the total number of input words sampled, an indication can be obtained as to the proportion of the computer's time occupied by the supervisory program (i.e. the "overhead" taken by the supervisory program). Therefore the FIG. 1 system includes counters 40 which receive CLKIN pulses to count the total number of input words sampled and which receive signals from the memory circuits 24 to count the number of words accepted by the memory 22. The output from the counters 40 is fed to the display circuits 26 which generate (FIG. 2) a display 42 identifying the total number of input words sampled and a display 44 identifying the number of input samples accepted by the memory 22. (Alternatively a single display representing display 44 as a percentage of display 42 can be generated.)

Normally in the FIG. 1 system, sampling and displaying will not occur concurrently. Instead a mode switch 46 is provided (connected, by connections not shown in FIG. 1 and explained later, to certain of the circuits shown in FIG. 1). When the mode switch 46 is in its sample position, input words are sampled and appropriate locations in the memory 22 are incremented. When the mode switch 46 is in its display position, no sampling occurs and instead the memory contents are displayed on the screen 29. If both sampling and display were to occur at the same time, then more complicated and expensive circuits would be required for controlling the memory 22.

DETAILED DESCRIPTION

1. INPUT BUFFER, ADDRESS CALCULATING CIRCUITS

Figure 3:
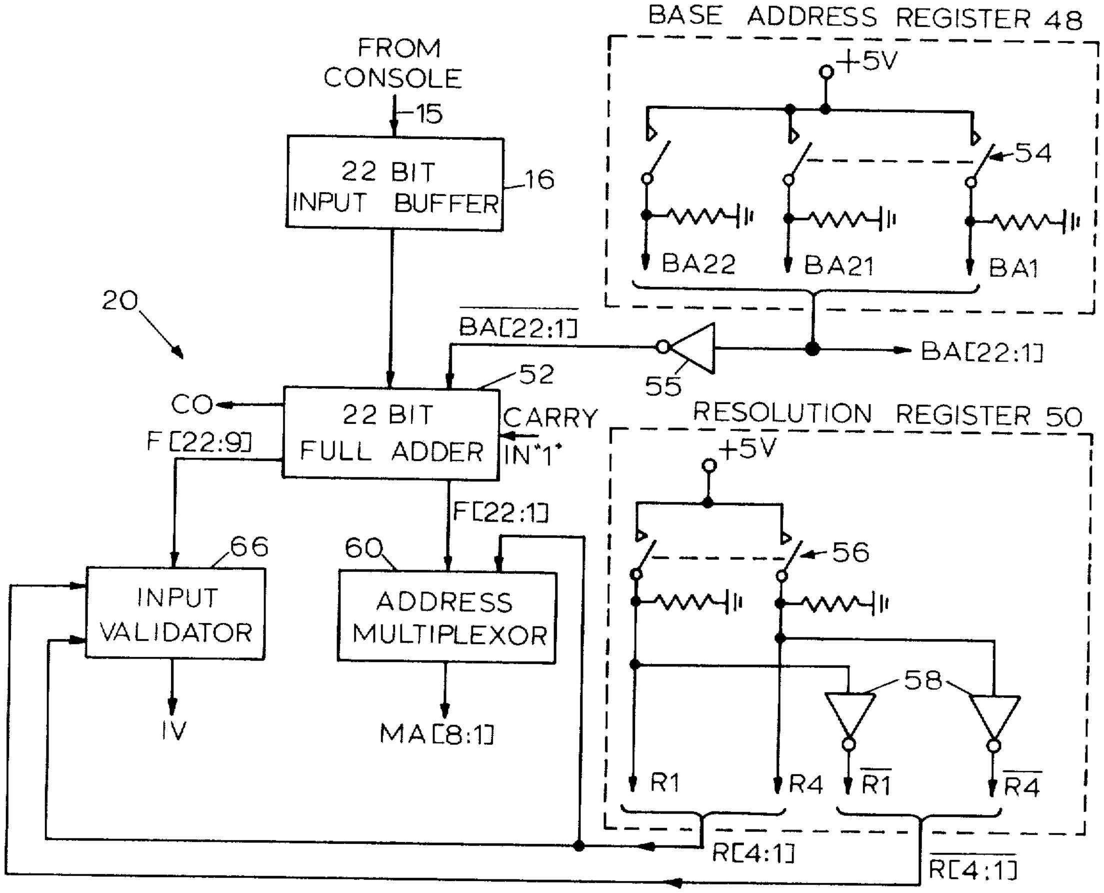
FIG. 3 is a block diagram of address calculating circuits of FIG. 1.

Reference is next made to FIG. 3, which shows the input buffer 16 and, in more detail, the address calculating circuits 20. As indicated in FIG. 3, the input buffer 16, which is of standard construction, contains storage for 22 bits, which is adequate for most present computer installations. A 22 bit input word is clocked into buffer 16 via leads 15, which consist of 22 parallel leads connected to appropriate terminals in the console 14.

In order to calculate memory addresses for input words, a base address register 48 and a resolution register 50 are provided. The purpose of these registers is as follows. Ideally memory 22 would be very large and would have a separate memory address for each potential input word to be sampled. However, the number of possible input words that might occur with 22 bits of $2^{22}$, or about four million. It is not usually economically feasible to provide four million memory locations, particularly when each must have capacity to store quantities from zero up to a relatively large number (to indicate the number of occurrences of an input word).

Therefore memory 22 preferably has a restricted number of memory addresses. In the typical system here described, memory 22 has 256 memory addresses. If only one input word is assigned to each memory address, then only 256 input words can be used to form the histogram shown in FIG. 2. However, if two input words are assigned to each memory address (i.e. the occurrence of either of those input words will cause the memory to be incremented at that address), then 512 words can be used to form the histogram (but the resolution is now 2 instead of 1, since there are two input words associated with each address). By increasing the number of input words assigned to each memory address, more input words can be used to form the histogram (but of course the resolution suffers).

The base address register 48 is used to set a lower boundary for the range of input words accepted by the memory. Register 48 is preset with a 22 bit word BA indicative of the base address or lowest value input word for which a memory location will be incremented. Any input word of value less than the base address will be rejected.

The resolution register 50 is preset with a 4 bit word indicative of the resolution to be used. Employing the base address and the resolution, a memory address MA for a given input word is then calculated by subtracting the base address from the input word, dividing the resultant by the resolution R, and if the result of the division is not an integer, taking the next smallest integer. In other words:

$$MA = \left.\frac{(\text{input word}) - BA}{R}\right| \text{ next smallest integer}$$

For example, for an input word of 5, with the base address BA equal to 0 and the resolution R being 1, then MA=5 and the sampling of an input word of value 5 will cause memory address 5 to be incremented by one.

In general, for a word to be "accepted" during sampling (i.e. for it to cause a particular memory address to be incremented), it must be between the boundaries given b the following relationship:

$$BA \leq \text{input word} \leq 256R + BA - 1$$

For example, if the resolution is 1, and the base address is 0, then the input word must be between 0 and 255 before it will cause a memory address to be incremented. All input words of value greater than 255 will be rejected.

Thus the base address is a lower bound and the base address and resolution together determine an upper bound, for input words that will cause the memory 22 to be incremented.

To calculate the memory address assigned to any given input word, the first step is to subtract the base address BA from the input word. This is carried out by a conventional 22 bit full adder 52 shown in FIG. 3. It will be seen that adder 52 receives from base address register 48 not the base address BA, but the inverse of this or $\overline{BA}$ (because a subtraction is being carried out). A "1" is carried into the adder because it performs 2'3 complement addition. The symbol $\overline{BA}$ [22:1] in the drawing indicates that signal or word $\overline{BA}$ is a 22 bit word consisting of bits 22 to 1 inclusive.

The base address register 48 can be any standard settable register. In FIG. 3 it is shown as having a set of 22 switches 54 which can be open or closed to produce low or high signals representative of $\overline{BA}$ [22:1]. Inverters schematically indicated at 55 then produce signal BA [22:1].

In the typical embodiment described, since the input words contain 22 bits and since the memory 22 contains only 256 or $2^8$ addresses, the resolution must be $2^{14}$ if all possible input words are used to form the histogram, i.e. $2^{14}$ (or about 16,000) input words will then be assigned to each memory address. Therefore a resolution from 1 (i.e. $2^0$) to $2^{14}$ is provided, each resolution being double the preceding resolution, so that there are 15 different resolutions in all. The resolution signal R from the resolution register 50 is thus a 4 bit signal R [4:1]. Register 50 can be any standard settable register and is, for simplicity, shown as comprising a set of four switches 56 which can be open or closed to supply low or high signals for the bits of signal R [4:1]. In addition, inverters 58 supply signal $\overline{R}$ [4:1] for a purpose to be described.

After the base address BA [22:1] has been subtracted from the input word in adder 52, the resultant signal F [22:1] must be divided by the resolution, to calculate a memory address. This is performed by an address multiplexor 60 which receives each word F and calculates an 8 bit memory address MA [8:1] therefrom.

Figure 4:
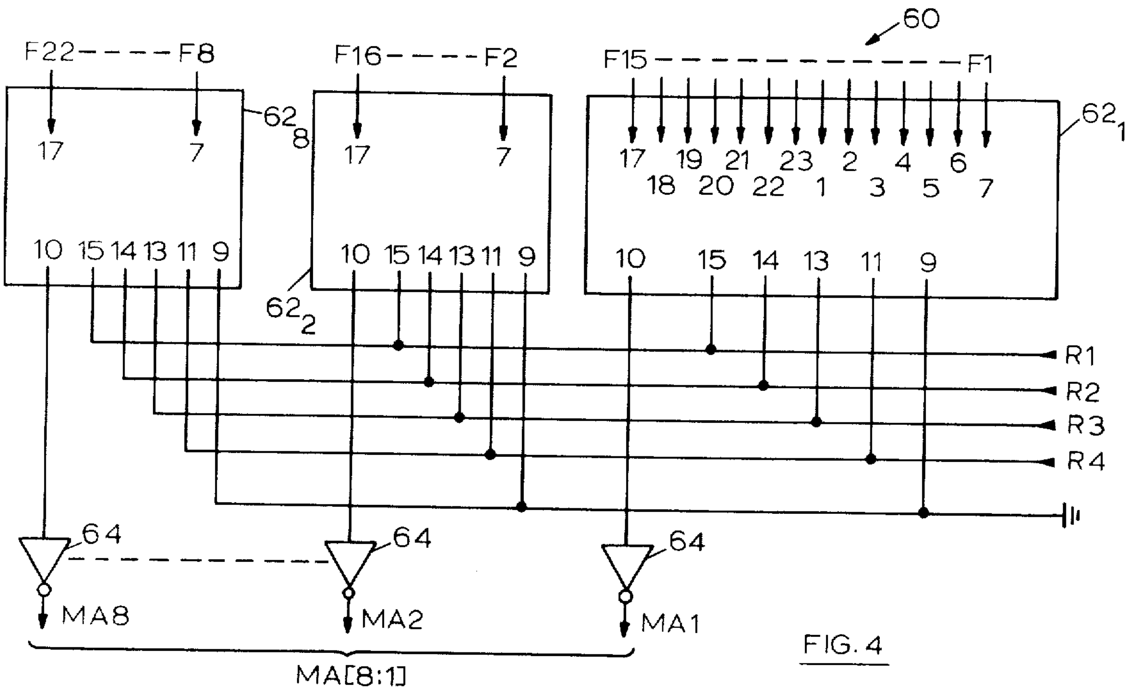
FIG. 4 is a schematic of an address multiplexor of FIG. 3.

The address multiplexor 60 is shown in detail in FIG. 4 and includes eight multiplexor chips $62_1$ to $62_8$ model No. SN 74150 produced by Texas Instruments Inc. of Dallas, Texas. The numbers appearing within the chips $62_1$ to $62_8$ are the actual pin numbers of the chips. On these chips, pins 1 to 7 inclusive and 16 to 23 inclusive are for data inputs; pins 11 and 13 to 15 inclusive are data select lines, and pin 10 is an output line. Depending on the information bits supplied at the data select pins, an input at any one of the fifteen input terminals of the chip appears, inverted, at the output pin 10.

In the FIG. 4 multiplexor use is made of the fact that if the resolution is 1, then the least significant eight bits of the word F are used to form the address of the location to be incremented in memory 22. If the resolution is 2, then bits 2 to 9 of word F will be used to form each memory address (since words F having values zero and one will cause the first memory address to be incremented; words F having values two and three will cause the second memory address to be incremented, etc.). Similarly, for the highest resolution of $2^{14}$, bits 15 to 22 of word F are used to form a memory address.

Therefore, as shown in FIG. 4, chip $62_1$ receives bits F1 to F15; chip $62_2$ receives bits F2 to F16, and so on to chip $62_8$, which receives bits F8 to F22. When the resolution is 1, signal R [4:1] is 0001 and the inputs at pins 7 of the chips will appear, inverted, at the output pins 10. Inverters 64 are then used to produce the final output MA [8:1]. If the resolution signal R [4:1] were 1111, then bits F15 to F22, inverted, would appear at the outputs of chips $62_1$ to $62_8$. The memory address signal MA [8:1] is used to address the memory 22 as described presently.

The FIG. 3 circuit also includes an input validator 66. This device is used to determine whether the input word, after subtraction of the base address (to form word F) is above the upper boundary of the range of words being sampled. Input validator 66 operates according to the following logic. If the resolution is 1, then memory addresses are provided for words F having values from 0 to 255; if the word F is 256 or greater, it will be above the upper boundary of the range being sampled. In other words, if the resolution is 1, the word F should not contain more than 8 bits; if any bit from bit 9 to bit 22 is a 1, then word F will be of value above the range being sampled. Therefore, for a resolution of 1, all bits of word F from 9 to 22 inclusive should be 0's.

Similarly, for a resolution of 2, all bits of word F from 10 to 22 inclusive should be zero; for a resolution of $2^2$ all bits of word F from 11 to 22 should be zero, etc. This can be expressed logically as follows:

If $\overline{R1}.\overline{R2}.\overline{R3}.R4.\overline{F9}.\overline{F10}.\overline{F11}.-\overline{F22}$ (resolution = 1 or $2^0$)
OR $\overline{R1}.\overline{R2}.R3.\overline{R4}.\overline{F10}.\overline{F11}.\overline{F12}-\overline{F22}$ (resolution = 2)
OR $\overline{R1}.\overline{R2}.R3.R4.\overline{F11}.\overline{F12}.\overline{F13}-\overline{F22}$ (resolution = $2^2$)
.
.
.
OR $R1.R2.R3.\overline{R4.F22}$ (resolution = $2^{13}$)
OR $R1.R2.R3.R4$ (resolution = $2^{14}$)
is equal to "1", then word F is not greater than the upper boundary of the range being sampled.

Figure 5:
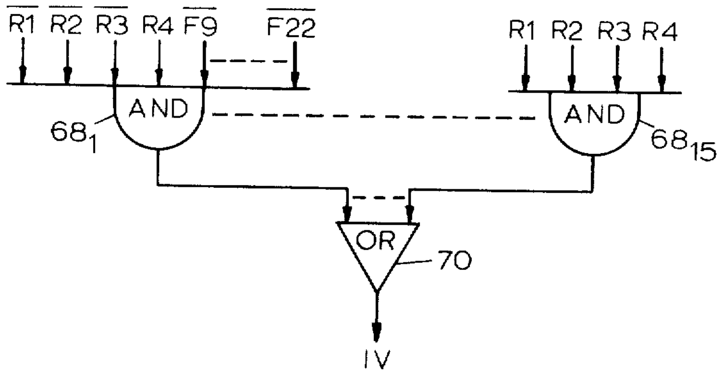
FIG. 5 is a schematic of an input validator of FIG. 3.

Any desired circuit may be used to perform the above logic and to output a signal if any one of the above expressions is a 1. FIG. 5 shows schematically a typical circuit, employing fifteen AND gates $68_1$ to $68_{15}$, one for each of the above expressions, with the output of each AND gate being directed to an OR gate 70. When any of the AND gates $68_1$ to $68_{15}$ produces a 1 output, then OR gate 70 produces an input valid signal IV.

2. MEMORY ADDRESSING AND INCREMENTING

Figure 6:
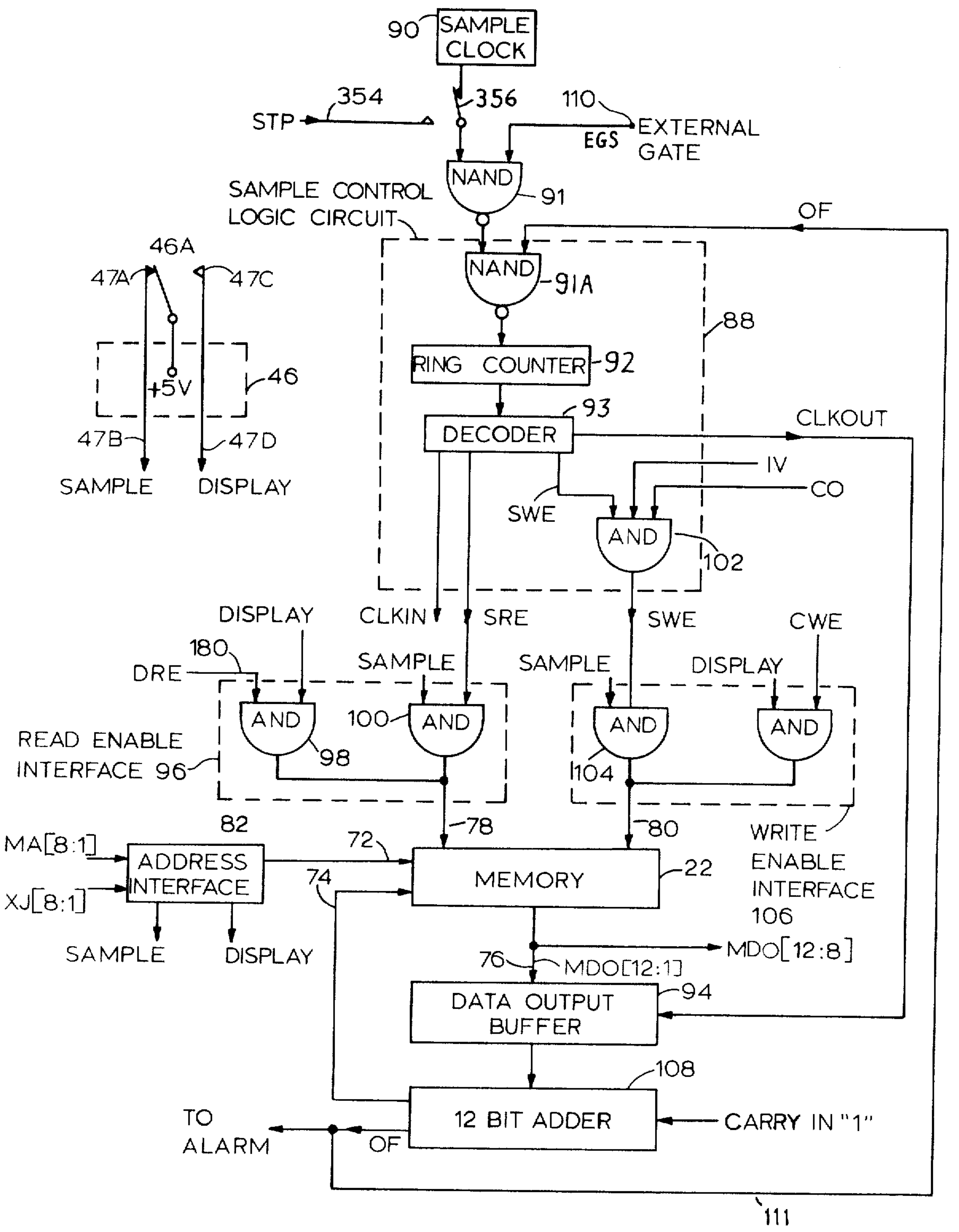
FIG. 6 is a block diagram of memory circuits of FIG 1.

Reference is next made to FIG. 6, which shows in more detail the memory circuits 20 and mode control switch 46 of FIG. 1. The mode switch 46 is shown simply as a switch blade *46a* connected to +5 volts and movable to either sample terminal *47a*, in which case the switch delivers a high output or sample signal at terminal *47b*, or to display terminal *47c*, in which case the switch delivers a high output or display signal at terminal *47d*.

The memory 22 shown in FIG. 6 typically consists simply of random access memory chips each model no. MK4002P produced by The Mostek Division of Sprague Electric Company of Texas, U.S.A. and described in Mostek data sheet No. 40021170 dated November, 1970. Each of these chips contains 256 bits organized in 64 words of 4 bits each. In the embodiment of the invention described, twelve of these chips are connected together in the conventional manner described in the data sheet to provide a memory of 256 words of 12 bits each. In this arrangement, the memory 22 requires an 8 bit address signal delivered on address input leads 72, and also has 12 data input leads 74 and 12 output data leads 76. The memory 22 also has a read enable input 78 to which read enable pulses are applied to read out the contents of a selected memory address, and a write enable input 80 to which write enable pulses are applied to cause data on the data input leads 74 of the memory to be written into a selected memory address.

Figure 7:
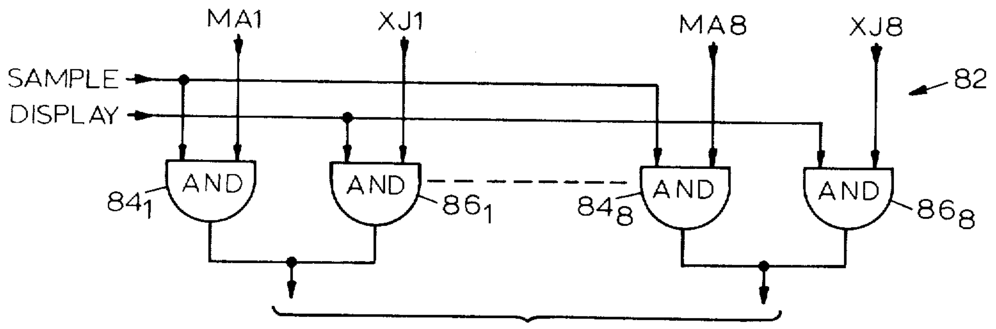
FIG. 7 is a schematic of an address interface of FIG. 6.

The memory address signal MA [8:1] from the address multiplexor 60 (FIG. 3) is fed to the memory address input leads 72 via an address interface circuit 82. Circuit 82, shown in detail in FIG. 7, includes eight AND gates $84_1$ to $84_8$, each of which receives one bit of the MA [8:1] signal together with the "sample" signal from mode switch 46. If mode switch 46 is not in its sample position, then no sample signal is received and signal MA [8:1] does not address the memory. Circuit 82 also includes eight further AND gates $86_1$ to $86_8$ which, when mode switch 46 is in its display position, gate bits XJ1 to XJ8 of a different address signal XJ, to be explained later, to the address leads 72 of the memory. It is assumed for the present discussion that mode switch 46 is in its sample position.

Figure 8:
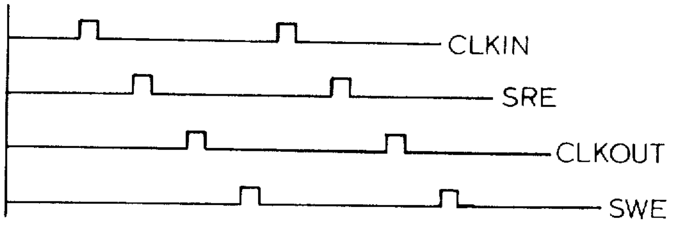
FIG. 8 is a timing diagram showing pulses produced by the sample control logic of FIG. 6.

FIG. 6 also contains a sample control logic circuit 88, which receives sample pulses from a sample clock 90. The sample pulses (directed through NAND gates 91, 91A the purpose of which will be explained presently) actuate a conventional three stage ring counter 92 (similar to ring counter 134 later described in connection with FIGS. 10 and 12). The signals from the ring counter 92 are decoded in a conventional decoder circuit 93 to produce the following output pulses illustrated in FIG. 8: the clock-in pulses CLKIN, which are used to clock a data word from the computer console 14 into the input buffer 16 of FIG. 1; sample read enable pulses SRE which permit the contents of an addressed memory location in memory 22 to be read out into a data output buffer 94 (FIG. 6); clock-out pulses CLKOUT which permit the buffer 94 to accept the data from the memory, and sample write enable pulses SWE which permit data to be written back into the memory when desired.

The sample read enable pulses SRE are fed to the read enable input 78 of memory 22 via a read enable interface circuit 96. Circuit 96 simply contains two AND gates 98, 100. Gate 98 receives pulses SRE and also the sample signal and gates pulses SRE to input 78 only if the sample signal is present. Gate 100 receives a display read enable signal DRE (to be explained presently) and gates this signal to input 78 only if the mode switch 46 is in its display position, generating a display signal.

The sample write enable pulses SWE from ring counter 92 are gated through an AND gate 102 only if gate 102 is supplied with two further signals, namely input valid signal IV from the input validator 66 of FIG. 3, and carry out signal CO from the adder 52 of FIG. 3. If signal CO is a 1, this indicates that the result of the subtraction in adder 52 is positive, i.e. that the input word is greater than the base address. If signal CO is a 0, this means that the result of the subtraction is negative, i.e. the input word is less than the base address. In other words, signals IV and CO will be 1's only if the input word is greater than the base address and less than the upper boundary of words accepted by the memory. When signals IV and CO are 1's, then sample write enable pulses SWE will be gated out of gate 102.

Pulses SWE are gated to the memory input 80 via an AND gate 104 in a write enable interface circuit 106. Gate 104 is supplied with the sample signal, so that SWE pulses from gate 102 reach the write enable input 80 only when mode switch 46 is in its sample position.

The circuit shown in FIG. 6 operates in the sample mode as follows. When an input word is received in the input buffer 16, an eight bit memory address MA [8:1] is computed therefrom by the address multiplexor 60, as previously described. Signal MA [8:1] is then fed to the address leads 72 of the memory 22. A sample read enable pulse SRE is then delivered to the memory, causing the contents of the memory at that address to appear on the data output leads 76 as signal MDO [12:1]. A clock-out pulse CLKOUT is next produced by the counter 92, causing the signal MDO [12:1] to be clocked into the data output buffer 94. The contents of data output buffer 94 are delivered into a twelve bit adder 108, where these contents are incremented by 1 by means of a carry-in 1 signal supplied to the adder 108. The results of the addition appear on the twelve parallel data input lines 74 to the memory.

However, the data appearing on data input lines 74 is not written back into the memory (i.e. the memory contents at the address in question are not incremented by 1) unless the memory address in question is valid, i.e. unless it is within the selected range (as selected by the base address and resolution registers). This is because if the input word is not within the selected range, then one of signals IV and CO will be missing and no sample write enable signal SWE will appear at memory write enable input 80. In the absence of a sample write enable signal, nothing can be written into the memory.

In summary at this point, the contents of the memory 22 at the particular location addressed will be incremented by 1 if the address calculated from the input word is valid (i.e. if the input word is within the selected range), but if the input word is not within the selected range, then although the contents of the memory 22 are read out and incremented by 1 in the twelve bit adder 108, the results of the addition are never written back into the memory 22 because no sample write enable pulse SWE is received. In this manner, a histogram is produced in the memory 22, each memory address containing a quantity indicative of the number of occurrences of the input word or words assigned to that address.

NAND gate 91 of FIG. 6 is provided for the following reason. If during the sampling process the computer temporarily enters a "wait" mode, in which computation stops while data is transferred, then the input word present at console 14 will be sampled a large number of times (with the MOSTEK memory described, the sampling can be at a high rate, up to 250,000 samples per second). To avoid erroneous results, an external gate terminal 110 is provided which can be connected to an appropriate location in console 114 to receive an external gate signal EGS at times when the computer is waiting. If signal EGS is present, NAND gate 91 prevents sample pulses from reaching the ring counter 92.

NAND gate 91A of FIG. 6 is used for the following purpose. Since memory 22 stores only 12 bit words, each memory address can store quantities only up to 4,095. If a memory address contains the quantity 4,095 and its contents are fed into 12 bit adder 108 and incremented by 1, the adder overflows and a carry-out or overflow signal OF appears on lead 111. Signal OF is fed to NAND gate 91A so that once an overflow signal OF occurs, sample clock pulses cease to be applied to counter 92 and again sampling ceases. Signal OF may also be fed to an audio or visual alarm, which can be part of the display of the TV monitor 28.

Conventional means, not shown, are provided to clear the memory when desired, by writing into each memory address until that address contains a data word equal to zero. During clearing, clear write enable pulses CWE from the clearing means (not shown) are fed to memory input 80 via AND gate 109 in the write enable interface 104, to permit writing into the memory during clearing.

3. DISPLAY CIRCUIT — GENERAL

Figure 9:
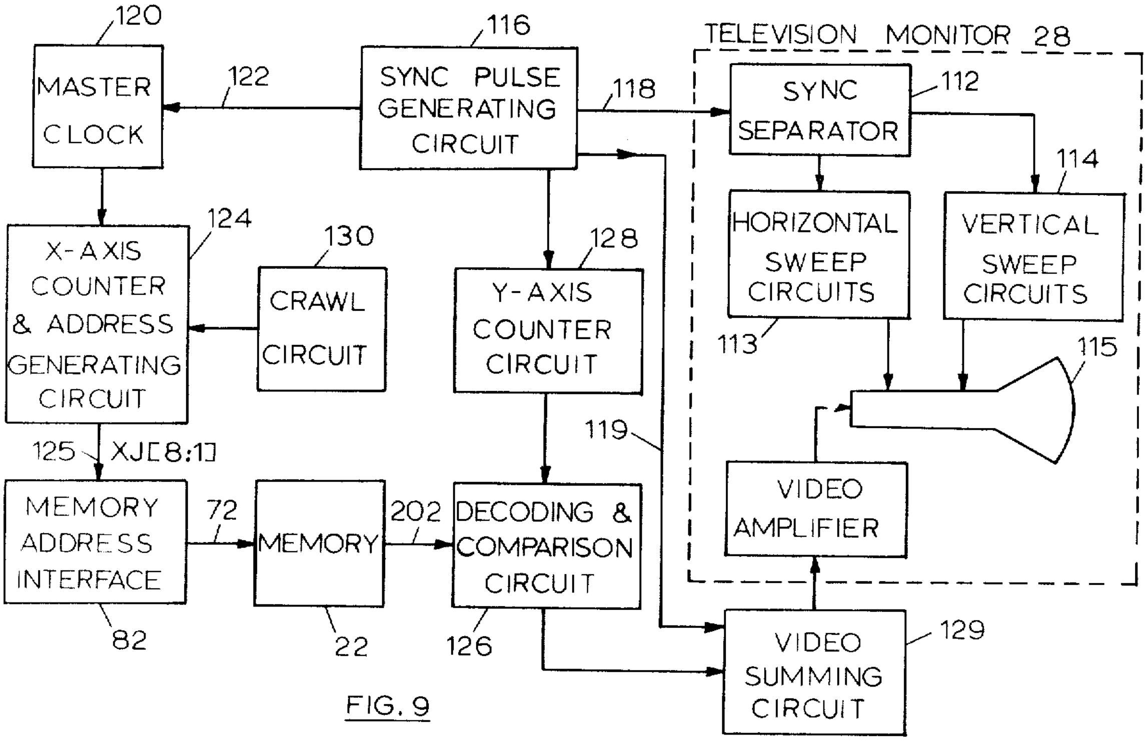
FIG. 9 is a block diagram of display circuits and a television monitor of FIG. 1.

The display circuits 26 by means of which the contents of the memory are read and converted to signals for display on the television monitor 28 will next be described. Reference is first made to FIG. 9, which shows in simplified block diagram form the portions of the display circuits 26 which cause the memory contents to be displayed on the screen 29 as vertical segments. The circuits for shifting the display to the left, and for displaying the cursor, and for displaying identifiers on the screen, will be described later.

It is a feature of the invention in a preferred embodiment that the histogram can be displayed on a standard television monitor — no special storage scope or the like is required. A typical television monitor 28 (which is essentially a TV receiver without a tuner or I.F. circuits, since the video and synchronizing signals are received directly) is shown in FIG. 9 as including a sync separator 112 which receives composite sync pulses and separates them into horizontal and vertical sync pulses, and horizontal and vertical sweep circuits 113, 114 which receive the horizontal and vertical sync pulses respectively and generate horizontal and vertical sweep signals to sweep the electron beam of tube 115. The monitor 28 may typically be model No. EVM 9 produced by Electrohome Limited of Kitchener, Ontario, Canada, but of course any standard TV monitor will do.

As shown in FIG. 9, the display circuits 26 include a conventional sync pulse generating circuit 116 (comprising a 31.5 KHz oscillator). Sync pulse generating circuit 116 produces horizontal and vertical sync pulses and blanking pulses and feeds a resultant composite sync signal to the monitor 28 via lead 118. The blanking pulses for the monitor are fed out on lead 119. In addition, the circuit 116 generates horizontal and vertical drive pulses, synchronized with the sync pulses as will be explained, which feed a master clock 120 via lead 122. The clock 120 is phase-locked to the horizontal drive pulses and produces pulses having an adjustable period, typically 120 n.s. (nanoseconds), so that the master clock provides a series of pulses during each horizontal line of the television monitor scanning beam.

Pulses from the clock 120 are fed to an X-axis counter and address generating circuit 124, which counts as the monitor's scanning beam travels from one side of the screen to the other, the count being an 8 bit count representing a series of addresses for the memory 22. These addresses, shown as signal XJ [8:1], are fed on leads 125 to the memory address interface circuit 82 and hence to the memory address leads 72. Thus, for example the circuit 124 may count from zero to thirty as the scanning beam travels from the left to the right hand side of the monitor screen 29 and thus successively addresses memory addresses zero to thirty via leads 72. The contents of memory locations zero to thirty, being successively addressed, are then read out one after the other into a decoding and comparison circuit 126.

After the scanning beam reaches the right hand side of the monitor screen, a new horizontal drive pulse is generated which causes the scanning beam to fly back to the left hand side of the screen and commence scanning again. The horizontal drive pulse resets the X-axis counter and address generating circuit 124 back to its initial count (e.g. zero) and this circuit commences to count again, thereby again reading the content of successive memory locations (e.g. addresses zero to thirty) into the decoding and comparison circuit 126.

In addition, vertical drive pulses from the sync generating circuit 116 drive a Y-axis counting circuit 128 in a manner such that the count in circuit 128 corresponds to the vertical or Y-axis position of the scanning beam. The count in the Y-axis counter circuit is also fed into the comparison circuit 126 where, for each X-axis position of the beam, the Y-axis count (i.e. the Y-axis beam position) is compared with the content of the memory address associated with that X-axis position. If for a given X-axis beam position the quantity read from the memory location associated with that X-axis position is greater than the height of the scanning beam (as indicated by the Y-axis count from circuit 128), then a short pulse is gated out of the comparison circuit 126 and fed to a video summing circuit 129 which amplifies the pulse and feeds it to the picture tube 115 to produce a dot on the screen at the X and Y coordinates in question. Blanking pulses applied to circuit 129 via lead 119 ensure that the screen is blanked during flyback. Thus, as the beam scans down the screen 29 of the monitor 28, the vertical segments 32 of FIG. 1 are produced.

The X-axis counter and address generating circuit 124 counts only about 30 to 40 addresses each horizontal scan (producing between 30 and 40 vertical segments on the screen). Although it could be made to count through a higher number of addresses if desired, more vertical segments would then appear, crowded closer together, and would be harder to view. Therefore, the contents of only about 30 to 40 memory locations can be viewed on the screen at any one time. However, the contents of the remaining addresses can be viewed by setting the circuit 124 to successively higher initial counts after groups of horizontal scans, instead of always resetting it to the same initial count. This will cause successively higher groups of memory locations to be addressed by circuit 124, thus (as will be explained in more detail presently) causing the histogram on the screen to appear to move to the left, so that the contents of all memory locations can be viewed on the screen.

For this purpose a crawl circuit 130 is provided to control the initial count to which circuit 124 is reset after horizontal scans. The crawl circuit 130 will be described in more detail presently.

4. X-AXIS COUNTER AND ADDRESS GENERATING CIRCUIT

Figure 10:
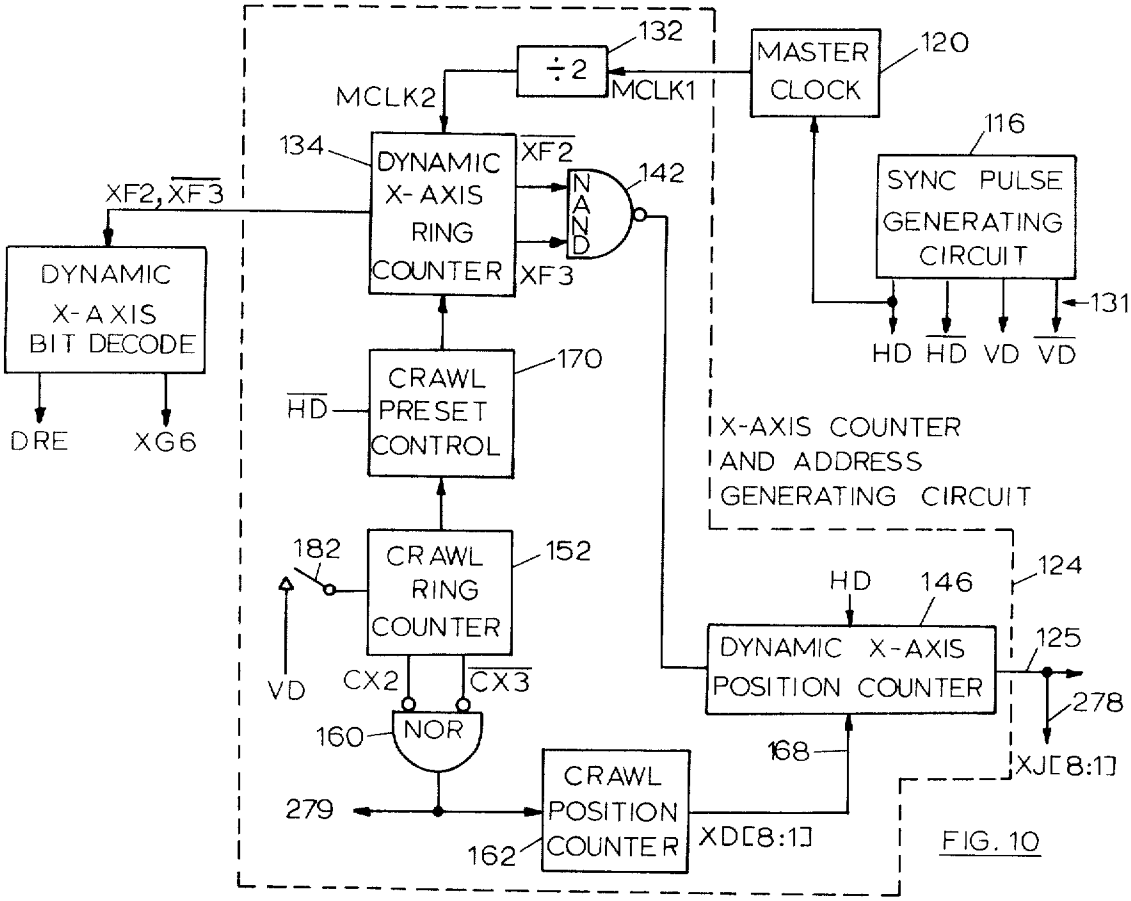
FIG. 10 is a block diagram of an X-axis counter and address generating circuit of FIG. 9.

Reference is next made to FIG. 10, which shows the X-axis counter and address generating circuit 124 and other portions of FIG. 9 in more detail. As shown in FIG. 10, the circuit 116 (which is a conventional sync generating circuit) supplies at its terminals 131 horizontal drive pulses HD, $\overline{HD}$, and vertical drive pulses VD, $\overline{VD}$. The HD pulses, which are shown in the first line of the FIG. 11 timing diagram, are typically simply horizontal blanking pulses (although in one monitor constructed according to the invention, the HD pulses were horizontal blanking pulses minus the back porch interval). Similarly, the VD pulses are typically simply vertical blanking pulses. No details of circuit 116 have been shown since it is a conventional sync and blanking pulse generating circuit well known to those skilled in the art.

Figure 12:
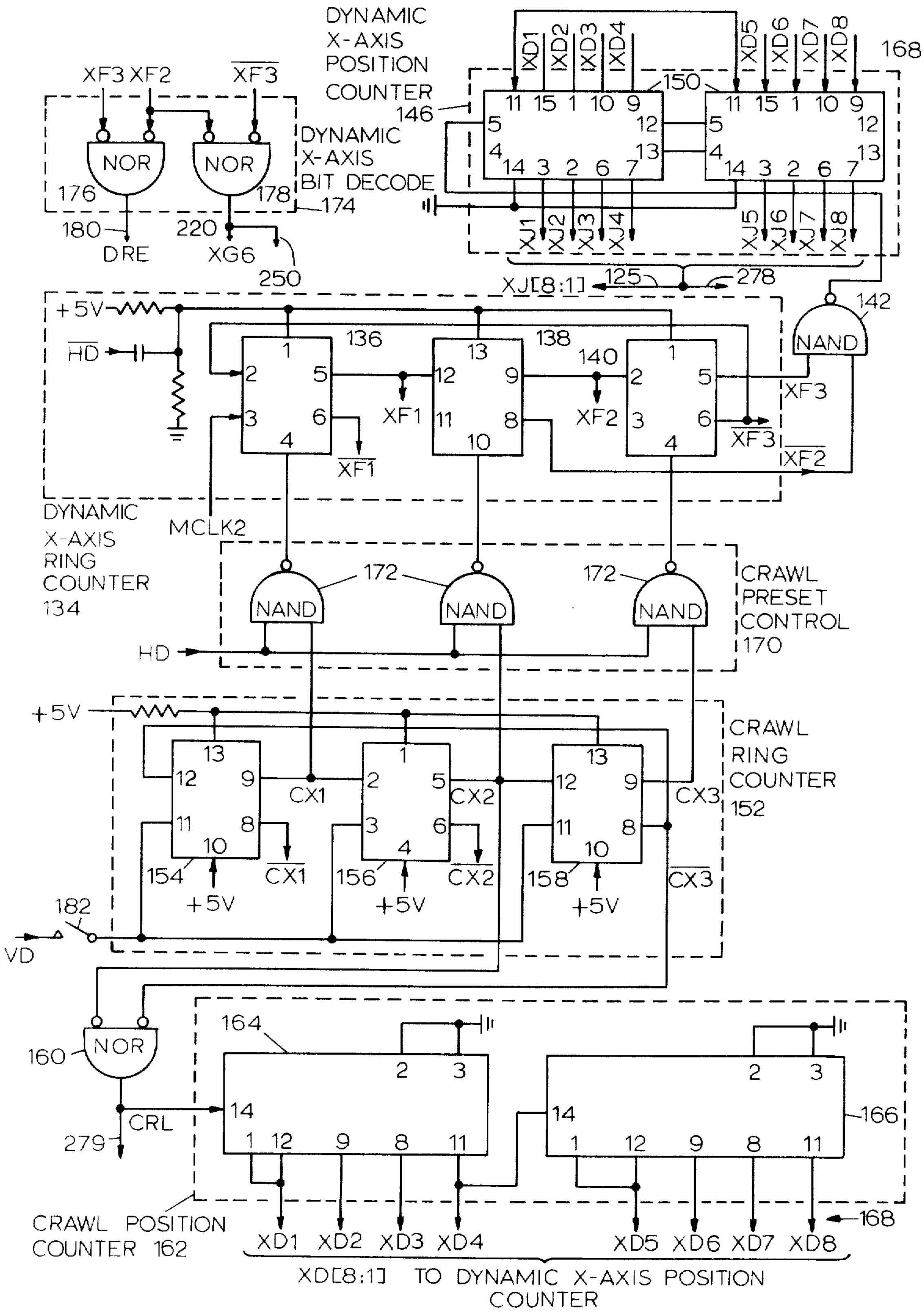
FIG. 12 is a schematic of portions of the FIG. 10 block diagram.

The master clock 120, which is phase-locked in conventional manner to pulses HD, produces pulses MCLK1 of 140 n.s. period which are shown in the second line of the FIG. 12 timing diagram.

Figure 11:
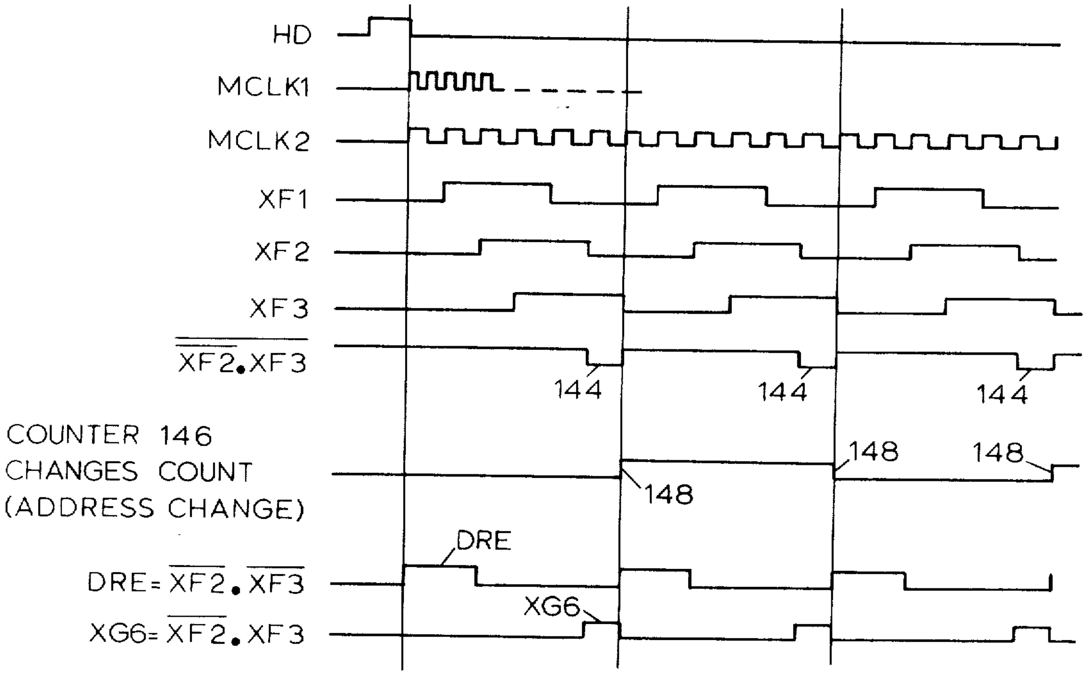
FIG. 11 is a timing diagram showing pulses produced by the FIG. 10 circuit.

Pulses MCLK1 are frequency divided by two by a frequency divider 132, and the resultant clock pulses MCLK2, shown in the third line of FIG. 11, are fed to a dynamic X-axis ring counter 134. The ring counter 134, shown in detail in the circuit diagram of FIG. 12 has three stages and is of standard design, employing chips 136, 138, 140. Chips 136, 138 are actually two portions of a single package, made by Texas Instruments Inc. under its model No. SN 7474. Chip 138 is one half of a second identical package model No. SN 7474 (the numbers shown on the chips are the pin numbers of the devices). The ring counter produces in conventional manner three sets of signals XF1, XF2 and XF3 (shown in FIG. 11), as well as the inverse of these signals, each signal having a period of six of the pulses MCLK2 or 1680 n.s. When the chips 136, 138, 140 of the ring counter receive horizontal drive pulses $\overline{HD}$ applied through capacitor 149 to their pins 1, 13, 1 respectively (FIG. 12), the chips are reset to a zero condition (but they may then be further reset, by signals to be explained applied to pins 4, 10, 4 of the chips).

Signals $\overline{XF2}$ and XF3 from the ring counter are fed to a NAND gate 142, which produces an output signal $\overline{XF2 \cdot XF3}$ which goes low at times 144, i.e. when signals $\overline{XF2}$ and XF3 are both present. Signal $\overline{\overline{XF2} \cdot XF3}$ is fed to a dynamic X-axis position counter 146 to step the counter at the end of each pulse 144, i.e. at the times indicated at 148 in FIG. 12.

The counter 146 is a standard presettable up-down counter composed of two identical parallel connected chips 150 (FIG. 12), these chips being produced by Texas Instruments Inc. under its model No. SN 74193. The pin numbers shown for the chips 150 are the actual pin numbers of the chips. The chips 150 produce at output pins 3, 2, 6, 7 an eight bit output count XJ [8:1], composed of bits XJ1 to XJ8, and on receipt of horizontal drive pulses $\overline{HD}$ received at pins 11, the chips 150 are reset to whatever initial count is received at pins 15, 1, 10, 9. The output count XJ [8:1] is fed on leads 125 to the memory address interface circuit 82 as previously described.

The initial count to which the dynamic X-axis position counter 146 is reset is determined by a crawl three stage ring counter 152 which is shown in detail in FIG. 12. The crawl ring counter 152 is composed (see FIG. 12) of three chips 154, 156, 158, of which chips 154, 158 are identical to chip 138 and chip 156 is identical to chips 136, 140. The crawl ring counter is driven (when crawl or shifting of the display to the left is desired) by vertical drive pulses VD applied to pins 11 of chips 154, 158 and pin 3 of chip 156, and produces signals CX1, CX2, CX3, $\overline{CX1}$, $\overline{CX2}$, $\overline{CX3}$, similar to signals FX1, FX2, FX3, $\overline{FX1}$, $\overline{FX2}$, $\overline{FX3}$ respectively.

From the crawl ring counter 152, signals CX2, $\overline{CX3}$ are fed via NOR gate 160 to a crawl X-axis position counter 162. Counter 162 is a conventional counter composed (FIG. 12) of two identical parallel connected chips 164, 166 model No. SN 7493 produced by Texas Instruments Inc. After each pulse $\overline{CX2+CX3}$ is received at pin 14 of chip 164, counter 162 is incremented by 1, the output eight bit count XD [8:1] being composed of bits XD1 to XD8 supplied at pins 12, 9, 8, 11 of the chips 164, 166. Bits XD1 to XD8 are fed on eight parallel leads 168 (FIG. 10) to the initial count input pins 15, 1, 10, 9 (FIG. 12) of the dynamic X-axis position counter 146. Thus, at the beginning of each horizontal line, the count in counter 146 is reset to the value represented by signal XD [8:1].

In addition, signals CX1, CX2, CX3 are gated through a crawl preset control 170 to the dynamic X-axis ring counter 134, to preset selected stages of this counter at the beginning of each horizontal line, after the stages have been set to zeros by signal $\overline{HD}$ applied through capacitor 149. The crawl preset control 170 consists of three NAND gates 172 which receive as inputs signals CX1, CX2, CX3 and also horizontal drive pulses HD, so that signals CX1, CX2, CX3 reach ring counter 134 to perform their presetting function only during each horizontal drive pulse. Since a signal on pins 4, 10, or 4 of chips 136, 138, 140 respectively sets the respective chip high, the stages of counter 134 will be reset during HD pulses to a condition dependent on the status of signals CX1, CX2, CX3.

The last circuit shown in FIG. 10 is a dynamic X-axis bit decode circuit 174, shown in detail in FIG. 12 as consisting of two NOR gates 176, 178 which receive signals XF3, XF2 and XF2, $\overline{XF3}$ respectively. Gate 176 produces display read enable pulses DRE which are shown in the FIG. 11 timing diagram and which occur immediately after each change of count by position counter 146. Pulses DRE are fed on lead 180 to the read enable interface circuit 96 of FIG. 6 to permit readout of an addressed memory location when the apparatus is in its display mode. Gate 178 produces display pulses XG6 which, as shown in the FIG. 11 timing diagram, occur at the end of the interval between counts of position counter 146. As will be explained, pulses XG6 are the pulses which (amplified) are used to create dots on the monitor screen 29 and are therefore of short duration (280 n.s. in the embodiment described).

In summary at this point, the operation of the FIGS. 10 and 12 circuit is as follows. When horizontal drive pulses HD occur, signalling the start of a horizontal line, the master clock 120 produces 140 n.s. pulses MCLK1 which are divided by two to produce pulses MCLK2. Pulses MCLK2 drive the dynamic X-axis ring counter 134, which in turn drives the dynamic X-axis position counter 146 from an initial count, as determined by signal XD [8:1] from the crawl X-axis position counter, to a final count which is approximately thirty to forty counts (or addresses) higher than the initial count. As the dynamic X-axis position counter changes count, successive addresses are fed via leads 125 to the memory 22, addressing successive positions in the memory. During the time when each memory location is addressed, a display read enable pulse DRE is sent to the memory read enable input 78 to allow readout of the memory contents at the addressed location. Towards the end of the time when such location is addressed (to allow time for processing of the readout) a display pulse XG6 is produced to produce a dot (in a manner to be explained) on the screen if the memory contents, when compared with the Y-axis position of the beam, so require.

At the end of each horizontal line and during each horizontal drive pulse, the dynamic X-axis ring and position counters 134, 146 are reset to initial states dependent on the state of the crawl ring counter 152 and crawl position counter 162 respectively. If no vertical drive pulses VD are applied to crawl ring counter 152, then the counters 134, 146 are restored to the same state as they were in at the start of the horizontal line, and the display remains stationary. If pulses VD are applied to crawl ring counter 152, this steps ring counter 152 (and hence, when pulses HD occur, the X-axis ring counter 134) through one-sixth cycle for each vertical sync pulse. Thus the crawl ring counter 152 and hence the dynamic X-axis ring counter 134 are reset each field to an initial condition one-sixth cycle more advanced than their previous initial conditions. After six fields the initial condition to which counters 152, 134 are reset have advanced one full cycle. The advance in the initial condition of ring counter 134 has the effect of causing the dynamic X-axis position counter to reach its counts one-sixth cycle of the ring counter 134 sooner, causing the histogram on the screen to appear to crawl slowly to the left by one-sixth position each field. After six fields, the crawl ring counter 152 has gone through a full cycle, and increments the crawl position counter 162 by one, so that the initial count in the dynamic X-axis position counter is incremented by one. Each vertical segment in the histogram has now shifted one full position to the left and occupies the position formerly occupied by its left hand neighbour.

The "crawl" or shifting of the display can be deactivated by opening switch 182 which terminates application of VD pulses to the crawl counter 152. If desired, the rate of crawl can be decreased, for example by frequency dividing pulses VD before applying them to crawl ring counter 152.

5. Y-AXIS COUNTER CIRCUIT

Figure 13:
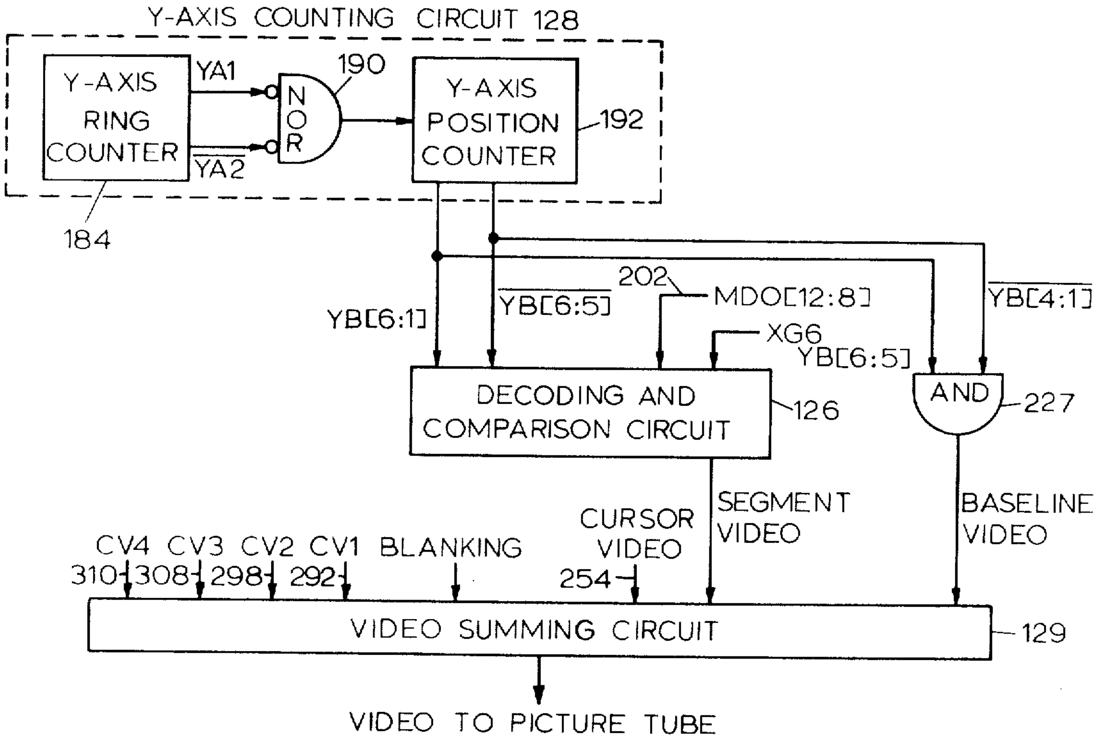
FIG. 13 is a block diagram of a Y-axis counter circuit of FIG. 9.
Figure 14:
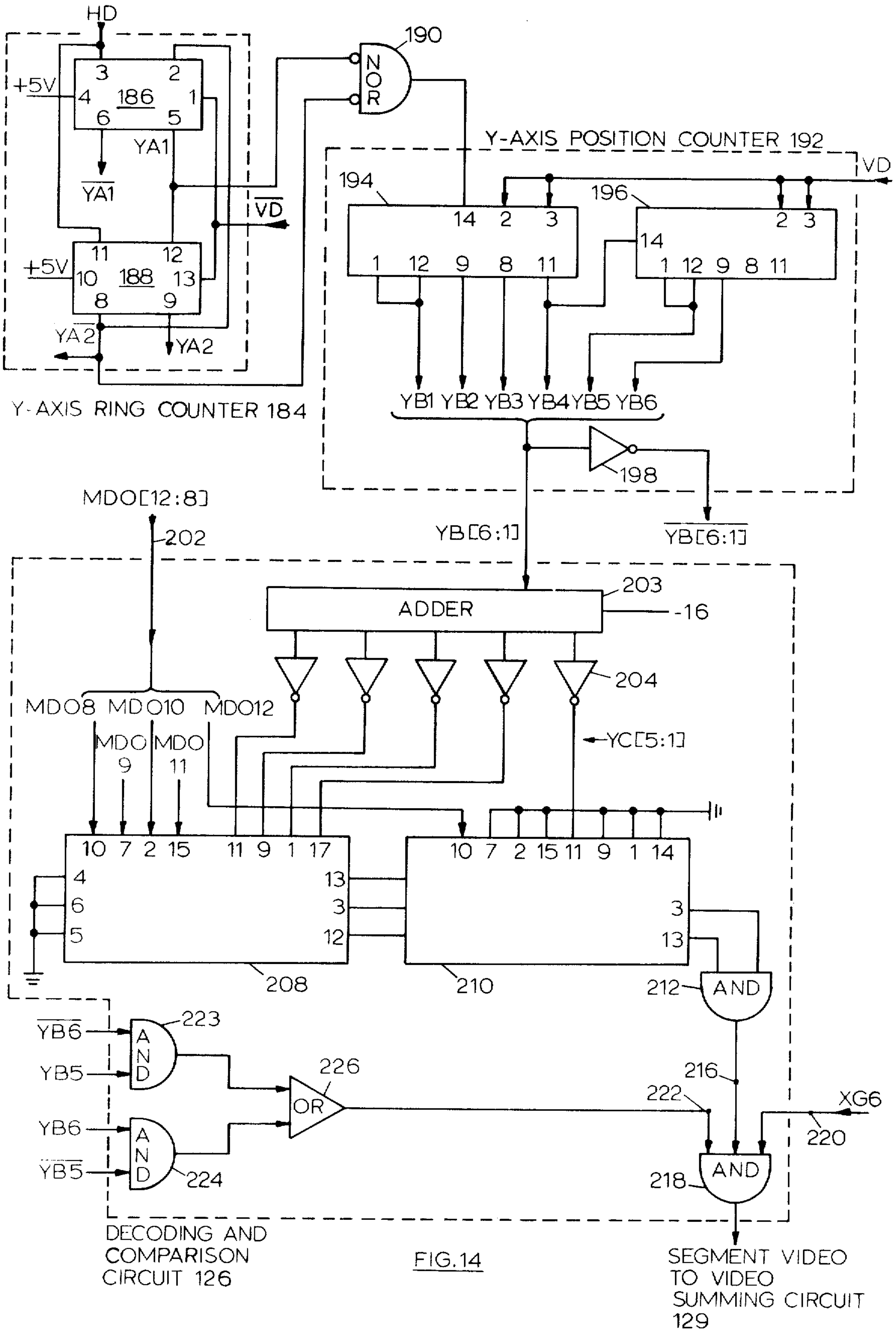
FIG. 14 is a schematic of the FIG. 13 block diagram.

Reference is next made to FIGS. 13, 14 which show the Y-axis counting circuit 128 and the decoding and comparison circuit 126 in more detail. The Y-axis counting circuit 128 includes a Y-axis ring counter 184 which is identical to the X-axis ring counter 134 of FIGS. 10, 12 except that the Y-axis ring counter 184 contains only two chips 186, 188 which correspond to chips 136, 138 of counter 134; pins 3, 11 of chips 186, 188 are fed with HD pulses instead of pulses MCLK2, and pins 1, 13 of chips 186, 188 are fed with inverted vertical drive pulses $\overline{VD}$ instead of $\overline{HD}$. The Y-axis ring counter 184 produces signals YA1, YA2, $\overline{YA1}$, $\overline{YA2}$ which correspond exactly to signals XF1, XF2, $\overline{XF1}$, $\overline{XF2}$ from the X-axis ring counter 134.

Signals YA1, $\overline{YA2}$ are applied to a NOR gate 190, the output of which is applied to a Y-axis position counter 192. Counter 192 is shown in detail in FIG. 14 and is identical with crawl X-axis position counter 162 of FIG. 12 except that pins 2, 3 of the chips 194, 196 in counter 192 are supplied with pulses VD so that counter 192 is reset to an initial count of zero after each vertical field.

Thus, after every full cycle of the Y-axis ring counter 184 (a full cycle requiring 4 HD pulses), the Y-axis position counter 192 is incremented by 1, so that the Y-axis position counter counts in groups of four horizontal scanning lines. Since there are approximately 262 horizontal lines in each field, this means that the screen is divided along the Y-axis into 64 units. After each field a vertical drive pulse occurs which resets the Y-axis position counter back to zero. Although the Y-axis position counter can produce an eight bit signal, only six bits YB1 to YB6 are required since the screen is being divided vertically into only sixty-four units. Inverters 198 (FIG. 14) also produce signals $\overline{YB1}$ to $\overline{YB6}$ which are used for a purpose to be explained.

Bits YB1 to YB6, $\overline{YB6}$, $\overline{YB5}$, which are indicative of the Y-axis position of the scanning beam, are fed into decoding and comparison circuit 126 (shown in detail in FIG. 14) where they are compared with the contents of each memory location as read-out during the X-axis travel of the beam. In addition, memory signal MDO, previously described in connection with FIG. 6, is fed to the decoding and comparison circuit 126, together with signal XG6 from the bit decode circuit 174 of FIG. 12. If the decoding and comparison circuit 126 decides that the contents of the memory are sufficiently great relative to the Y-axis position of the scanning beam that the memory contents for a given X-axis position should be displayed, then signal XG6 is gated out to the video summing circuit 129 as segment video, amplified and delivered to the monitor picture tube 115.

The decoding and comparison circuit 126 receives readouts from the memory via leads 202 (FIGS. 6, 9, 13, 14). It will be noted that only bits 12 to 8 of memory content signal MDO are fed to the decoding and comparison circuit 126. This is because in the typical embodiment described, each vertical segment 32 (FIG. 2) of the histogram has a maximum height of thirty-two units (128 horizontal scanning lines). Since each memory location can contain up to 4,096 discrete quantities (0 to 4,095, represented by a 12 bit word), this means that each of the 32 available vertical units for each histogram segment must represent 4,096/32 or 128 discrete quantities. Therefore, if the memory content of a particular location being read is between 0 and 127, a vertical segment one unit high will be displayed for that location; if the memory content at that location is between 128 and 255, then the vertical segment for that location will be two units high, etc. (Display of one unit high segments for locations having a memory content of zero serves to identify the location of each segment to a user.) Since memory contents of value zero to 127 are all treated equally, the circuit 126 being required to make its first decision at a memory content value of 128, therefore the first seven bits of memory content signal MDO [12:1] are not required by circuit 126.

As shown in FIG. 14, the decoding and comparison circuit 126 includes an adder 203 into which signal YB [6:1] is fed. In the adder, the number $16_{10}$ is subtracted from YB [6:1], so that when YB [6:1] reaches a value of 16, the output of adder 203 is zero. The output of the adder 203, inverted by inverters 204, appears on leads 206 as signal YC [5:1]. When the output of adder 203 is zero, signal YC [5:1] is 11111, and signal YC [5:1] then decreases as the beam moves down the screen. Only a five bit signal is required from the adder 203 because the vertical segments are only 32 units high, and five bits are sufficient to produce 32 counts.

Signal YC [5:1] is compared to signal MDO [12:8] in two identical parallel-connected comparison chips 208, 210 which are produced by Texas Instruments Inc. under its model No. SN 74L85. (The pin numbers indicated on the chips 208, 210 are the actual pin numbers of the chips.)

The outputs at pins 3 and 13 of chips 210 are fed through AND gate 212 into one input 216 of another AND gate 218. A high signal will be delivered to the input 216 of AND gate 218 whenever signal MDO [12:8] is greater than or equal to signal YC [5:1] (the two signals being compared on an even basis). In other words, a high will occur at input 216 of gate 218 whenever the Y-axis position of the beam (measured on the 32 unit high scale, each unit being 128 memory quanta high) for a given X-axis position is lower than the content of the memory location for that X-axis position (and above the base line 30 of FIG. 2).

Signal XG6 is directed, as shown in FIG. 14, to a second input 220 of AND gate 218. Thus (ignoring input 222 of NAND gate 218 for the moment), whenever for any given X-axis position of the scanning beam the Y-axis position of the beam is below the value of the memory content being read, signal XG6 is gated via AND gate 218 to the video summing circuit 129.

In order to ensure that no vertical segment portions are displayed outside of the thirty-two unit high area, signals $\overline{YB6}$ and YB5 are fed to AND gate 223; signals YB6 and $\overline{YB5}$ are fed to another AND gate 224, and the outputs from the two AND gates 223, 224 are fed through an OR gate 226 to input 222 of AND gate 218.

By means of this circuit, a high will be received at input 222 whenever there exists signals $\overline{YB6}$.YB5 + YB6.$\overline{YB5}$, i.e. whenever the count in Y-axis position counter 192 is between 16 and 48, and no input will be received at input 222 for other counts of the Y-axis position counter. This simply ensures that spurious segments are not displayed on the screen.

6. BASELINE VIDEO

The base line 30 shown in FIG. 2 is generated by feeding signals YB [6:5] and $\overline{YB[4:1]}$ to a base line decoder circuit 224 shown in FIG. 13 and which is simply an AND gate. The AND gate 227 produces no output signal except when bits YB6, YB5, $\overline{YB4}$, $\overline{YB3}$, $\overline{YB2}$, $\overline{YB1}$ are all present, representing a count of 48, which is the Y-axis count at the bottom of the vertical segments (recall that the vertical segments commence 16 units down from the top of the screen and are 32 units high). When signal YB has a value of 48, AND gate 227 produces an output signal which is fed to the video summing circuit 129 to produce a video signal during the four scanning lines represented by the count of 48.

This produces a relatively thick and easy to view base line for the display.

7. CURSOR

Figure 15:
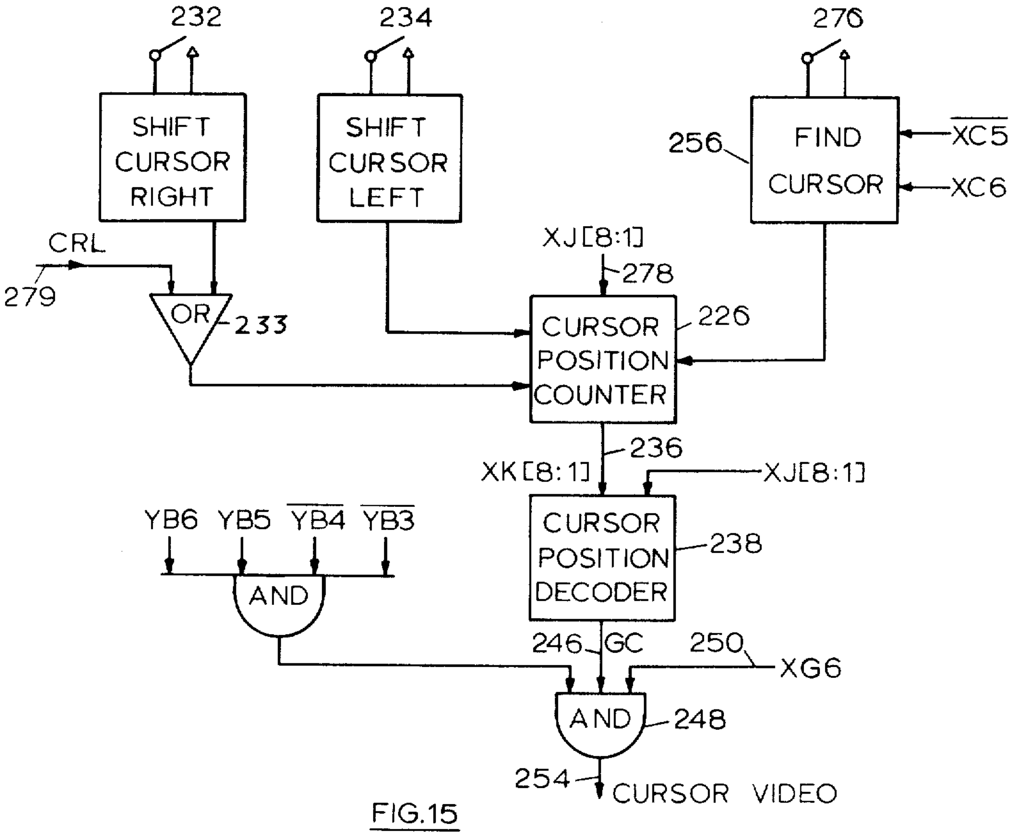
FIG. 15 is a block diagram showing means for generating a cursor for the FIG. 2 histogram.
Figure 16:
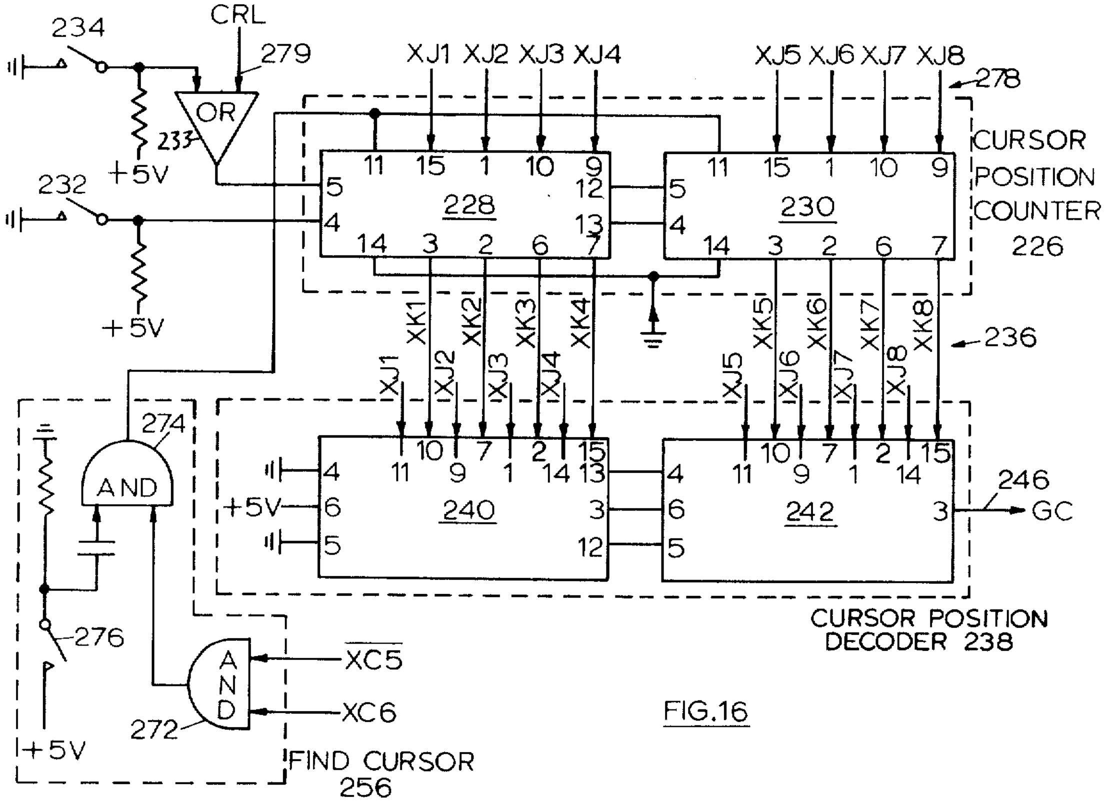
FIG. 16 is a schematic of portions of the FIG. 15 block diagram.

The circuits for generation of the cursor 34 of FIG. 2 will next be explained, with reference to FIGS. 15, 16. As shown in these drawings, a cursor position counter 226 is provided. Counter 226 is a presettable up-down counter composed of chips 228, 230 (FIG. 16) and is identical with the dynamic X-axis position counter 146 (again the pin numbers shown in FIG. 16 are the actual pin numbers of the chips used). The cursor position counter 226 can be made to count up by repeated operations of switch 232 (which applies pulses via NOR gate 233 to pin 5 of chip 228 and can be made to count down by repeated operations of switch 234 (which applies pulses to pin 4 of chips 228). The count in the cursor position counter 226 appears as an eight bit output signal XK [8:1]. Signal XK [8:1] is fed on eight parallel output lines 236 into a cursor position decoder 238.

The decoder 238 simply consists of two identical parallel-connected chips 240, 242 sold by Texas Instruments Inc. under its model No. SN 74L85. The decoder receives not only signal XK [8:1], but also receives, via leads 244, the signal XJ [8:1] from the dynamic X-axis position counter 146, representing the address generated by the dynamic X-axis position counter at any instant. The decoder 238 compares signals XK [8:1] and XJ [8:1], and when the two signals are equal, it produces an output gate cursor pulse GC on lead 246.

Signal GC from the cursor position decoder 238 is directed (FIG. 15) to one input of an AND gate 248. The display pulses XG6 are conducted via lead 250 to another input of gate 248. The remaining input of AND gate 248 is constituted by the output of an AND gate 252 which receives as inputs bits YB6, YB5, $\overline{YB4}$, $\overline{YB3}$ (representing a count of between 48 and 51 of the Y-axis position counter, i.e. a span of three units below the base line 30 of FIG. 2). Output pulses from AND gate 248 are directed via lead 254 to the video summing circuit 129 (FIG. 13).

Thus, whenever the scanning beam scans in the three units below the base line 30, and when the count in the dynamic X-axis position counter 146 (signal XJ [8:1]) becomes the same as the count (signal XK [8:1]) contained in the cursor position counter 226, a pulse will be fed on lead 254 to produce a spot on the screen, and as the beam scans down in these three units, the cursor display will be produced. It will be evident that the cursor always appears as a vertical extension, below the base line 30, of a vertical segment 32.

It can happen during use of the invention that the cursor 34 does not appear on the screen, because the XK [8:1] count contained in the cursor position counter 226 corresponds to memory addresses not displayed on the screen (since the contents of only about 30 to 40 out of 256 memory locations are displayed on the screen at any one time). FIGS. 15 and 16 therefore show a circuit 256 labelled "FIND CURSOR" which enables the user of the device to find the cursor in a simple manner. Circuit 256 requires the presence of a static X-axis position counter 258, shown with accompanying circuits in FIG. 17.

Figure 17:
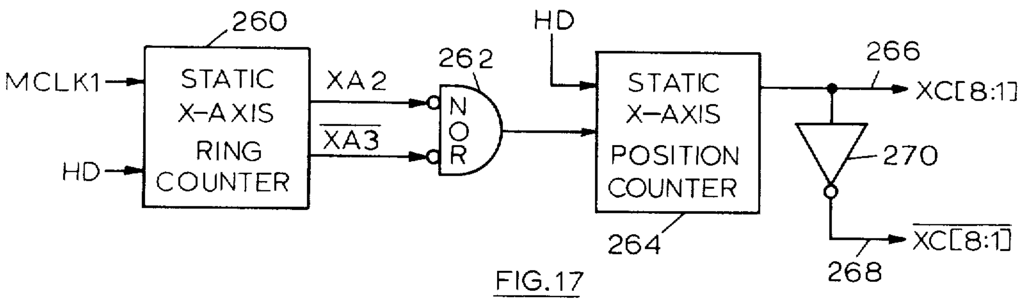
FIG. 17 is a block diagram of a static X-axis counting circuit.

The circuits shown in FIG. 17 include a static X-axis ring counter 260 which is a three stage ring counter identical with the dynamic X-axis ring counter 134. However, the static X-axis ring counter is supplied with pulses MCLK1 instead of MCLK2 from the master clock 120 and therefore counts at twice the rate of the dynamic X-axis ring counter 134.

The static X-axis ring counter 260 produces six signals XA [3:1] and $\overline{XA [3:1]}$ which correspond exactly to signals XF [3:1] and $\overline{XF [3:1]}$ from the dynamic X-axis ring counter. Signals XA2, $\overline{XA3}$ are fed to NOR gate 262, the output of which drives a static X-axis position counter 264. The static X-axis position counter 264 is identical with the Y-axis position counter 192 and produces an eight bit count XC [8:1] on eight output leads 266. Inverted signals $\overline{XC [8:1]}$ are produced on eight further leads 268 by eight inverters schematically indicated at 270.

The XC signals are indicative of the static X-axis position of the scanning beam on the screen at any given time. At the beginning of each horizontal scan, the horizontal drive pulses HD reset the static X-axis ring counter and the static X-axis position counter each to zero, and the ring counter 260 then drives the position counter 264 to count upwardly during a horizontal scan. Since each count of position counter 264 occupies a period of about 840 n.s., the counter will reach a count of between about 60 and 80 by the end of each horizontal line, depending on the exact period of pulses MCLK1. Therefore a count of 32 for the static X-axis position counter 264 indicates that the scanning beam is approximately in the middle of the screen.

Therefore, the cursor can be found and made to appear approximately in the middle of the screen simply by loading the contents of the dynamic X-axis position counter 146 into the cursor position counter 226 (FIG. 15) at the time when the static X-axis position counter reaches a count of 32 (meaning the beam is approximately in the middle of the screen).

For this purpose the cursor find circuit 256 (FIG. 15, 16) receives signals $\overline{XC5}$, XC6 (representing a count of between 32 and 47) from the static X-axis position counter 264. Cursor find circuit 256 contains (see FIG. 16) an AND gate 272 which produces a high output for counts between 32 and 47 of the static X-axis position counter. The output of AND gate 272 is fed to another AND gate 274. Gate 274 has a second input from switch 276. Normally the input from switch 276 to gate 274 is low, but when switch 276 is closed, a momentary high pulse is supplied to gate 274, causing an output from gate 274 to be applied to pins 11 of the chips 228, 230. Pins 11 are the "reset" inputs of the chips 228, 230, and when they are pulsed, information at the data inputs consisting of pins 15, 1, 10, 9 of these chips is loaded into the counter 226 as an initial count (exactly as in the case of the dynamic X-axis position counter 146).

Accordingly, the count XJ [8:1] from the dynamic X-axis position counter is fed on leads 278 to input pins 15, 1, 10, 9 of chips 228, 230. When switch 276 is closed, then as soon as the static X-axis position counter reaches a count of between 32 and 47, the count in the dynamic X-axis position counter 146 is loaded into the cursor position counter 226. This ensures that the cursor position will be approximately in the middle of the screen. Note that if switch 276 had to be closed exactly at the count of 32 (of the static X-axis position counter) to load the XJ count into the cursor position counter, a user would find it difficult to close switch 276 precisely at the correct time. However, since the user has a longer time span available (spanning counts 32 to 47 of the static X-axis position counter), he can relatively easily close switch 276 at the correct time.

Figure 18:
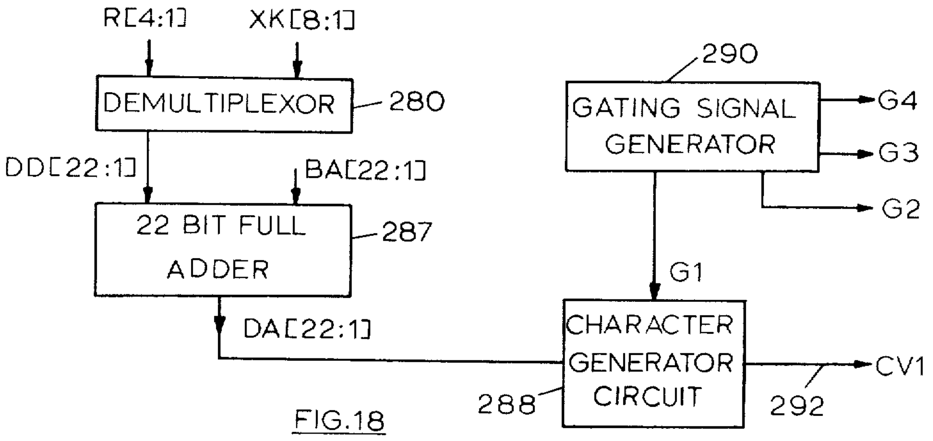
FIG. 18 is a block diagram of a demultiplexing and character generator circuit.

When the crawl switch 182 (FIGS. 10, 12) is activated to cause the display to move to the left, it is undesirable to have the cursor move to the left since it will then soon disappear from the screen. Therefore, as shown in FIGS. 17 and 18, the same signal that is used to increment the crawl X-axis position counter (FIG. 10), namely signal CRL, is also directed on lead 279 to OR gate 233 and used to increment the cursor position counter 226. Therefore, each time the crawl circuits shift the display to the left by one position, the cursor is shifted to the right by one position, so that the cursor remains stationary on the screen.

8. IDENTIFICATION OF SEGMENT POINTED TO BY CURSOR

Figure 19:
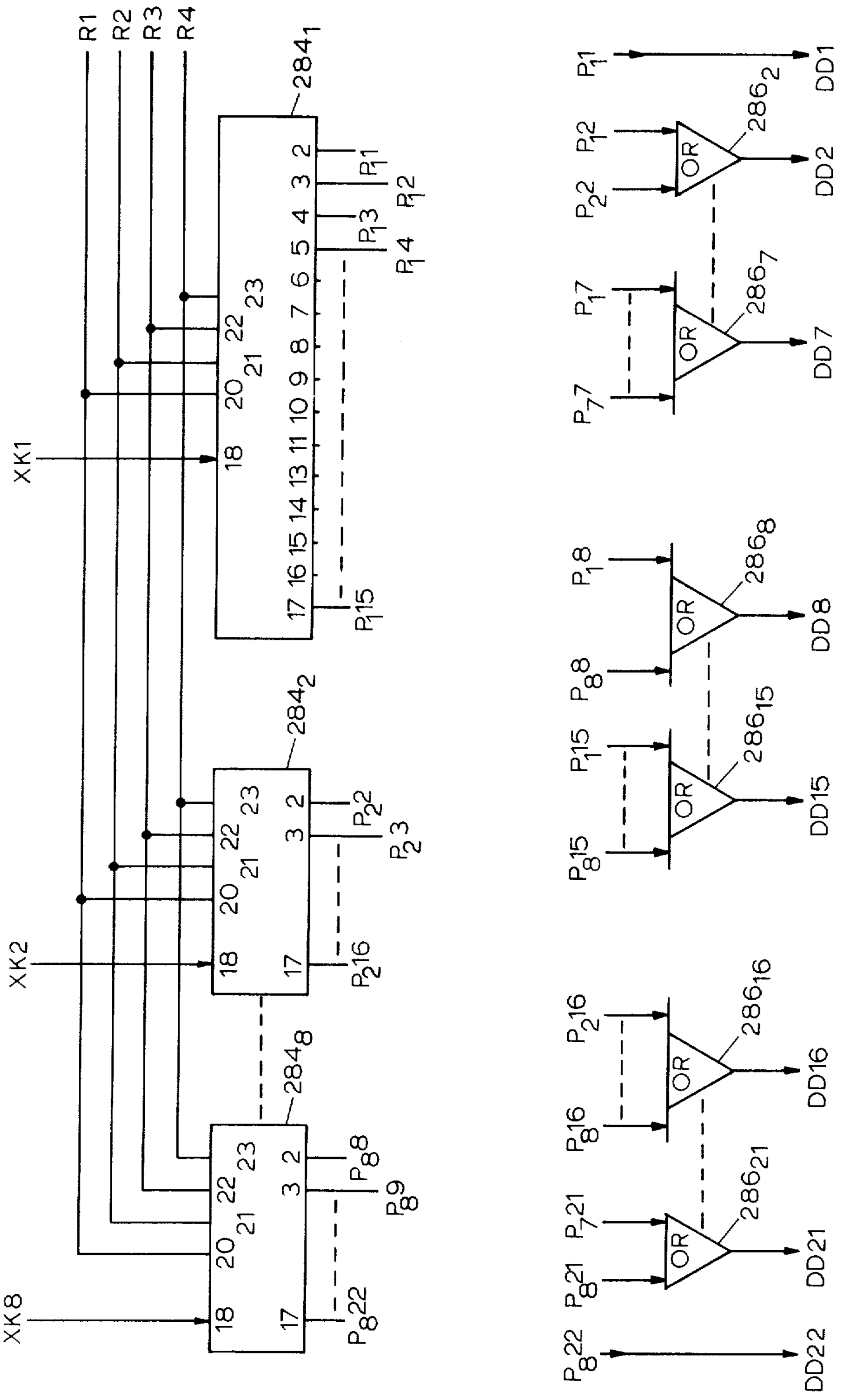
FIG. 19 is a schematic of a demultiplexor of FIG. 18.

As previously indicated, when the cursor is positioned under a particular vertical segment, it is desirable that the user be able to determine the input word (or range of input words, depending on the resolution) that has occurred sufficient times to give rise to that vertical segment. Accordingly, means shown in FIGS. 18, 19 are provided to compute the input word (or range of input words) giving rise to the vertical segment below which the cursor 34 is positioned. The calculation is carried out by the reverse process of address coding, i.e. when the scanning beam passes through the X-axis position of the cursor, the memory address for that position is detected, and using the resolution and base address signals, an identifier is coded. The identifier may then be sent to character generator circuits to be displayed on the screen (or it may be sent to other means for printing it out or displaying it).

As shown in FIG. 18, a demultiplexor 280 is provided, which receives signal XK [8:1] from the cursor position counter (FIG. 15) and which also receives signal R [4:1] from the resolution register 50 (FIG. 3). Signal XK [8:1] is the memory address of the vertical segment below which the cursor is positioned. The demultiplexor emplaces signal XK [8:1] in a 22 bit word DD [22:1] depending on the resolution. If the resolution is 1, the bits of signal XK [8:1] form bits 8 to 1 of word DD [22:1]; if the resolution is 2, the bits of signal XK [8:1] form bits 9 to 2 of word DD [22:1], etc. If the resolution is $2^{14}$, the eight bits form bits 22 to 15 of word DD [22:1]. All unused bits of word DD [22:1] are zeros.

The demultiplexor 280 is shown in detail in FIG. 19 and includes eight identical demultiplexor chips $\mathbf{284_1}$ to $\mathbf{284_8}$, made by Texas Instruments Inc. under its model No. SN 74154. The pin numbers shown in the drawing are the actual pin numbers of the chips. Bits XK1 to XK8 are applied to pins 18 of the chips, one bit for each chip, while resolution bits R1 to R4 are applied to pins 20 to 23 respectively of each chip. Each chip has 15 output pins numbered 2 to 11, 13 to 17, at which appear outputs $P_1$1 to $P_1$15 for chip 284, up to $P_8$8 to $P_8$22 for chip $\mathbf{284_8}$.

When input pin 18 of any chip is high or low, one of the 15 outputs (selected by resolution bits R1 to R4) goes high or low respectively, and the remaining 14 outputs are all low. Thus, if the resolution is 1 (bits R1 to R4 all zeros), the inputs to the chips will reappear at pins 2 of the chips as signals $P_1$1 to $P_8$8. If the resolution is 2 (signal R [4:1] is 0010), then the input bits will reappear as signals $P_1$2 to $P_8$9 from the chips.

The output signals from chips $\mathbf{284_1}$ to $\mathbf{284_8}$ are, except for signals $P_1$1 and $P_8$22, directed a set of twenty OR gates $\mathbf{286_2}$ to $\mathbf{286_{21}}$. Signals $P_1$1 and $P_8$22 appear directly as bits DD1 and DD22 respectively. It will be seen from FIG. 19 that if, for example, the resolution is 1, then: if bit XK1 is 1, then signal $P_1$1 is 1, and bit DD1 is 1; if bit XK2 is 1, then signal $P_2$2 is 1, and bit DD2 is 1, etc. In this manner the 22 bits of signal DD [22:1] are formed.

With reference again to FIG. 18, signal DD [22:1] is added to the base address signal BA [22:1] is a 22 bit adder 287 to form a resultant signal DA [22:1]. Signal DA [22:1] represents the input word (or range of input words if the resolution is greater than 1) giving rise to the vertical segment beneath which the cursor 34 is located.

Having generated signal DA [22:1], it remains simply to display this quantity on the television screen in a readable form. This is a standard procedure well known to those skilled in the art and will therefore be described only briefly. As shown in FIG. 18, signal DA [22:1] is fed to a character generating circuit 288. Circuit 288 typically includes a character generator chip model No. TMS 2403JC produced by Texas Instruments Inc., which chip accepts input data and upon receipt of gating pulses generates output pulses to form characters on a television screen. Appropriate gating pulses G1 are produced by a gating pulse generator 290, which receives signals XC and YB indicative of the scanning beam X and Y coordinate positions and feeds pulses G1 to the character generating circuit 292 at the correct times to cause it to generate display 36 (FIG. 2) on the monitor screen at the desired X and Y coordinates. (If a character generator chip model No. TMS 2403JC is used, then since this chip will not accept a 22 binary bit input word but instead accepts only ASC11 code, circuit 292 will also then include a binary to ASC11 encoder to code word DA [22:1] to a form acceptable to the character generating chip.)

The character generator output pulses, indicated as signal CV1 in FIG. 18, fed via lead 292 to the video summing circuit 129.

Figure 20:
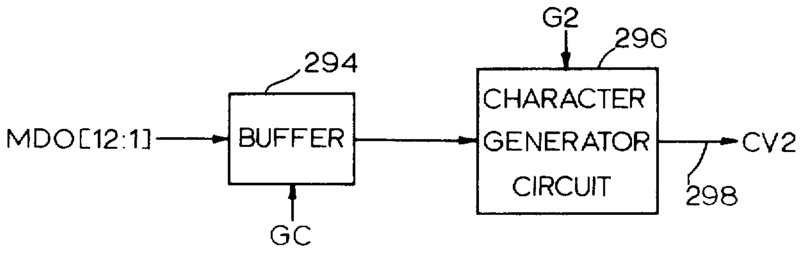
FIG. 20 is a block diagram showing means for producing a character display for the content of a memory location of a memory of FIG. 1.

In some cases it will be desired to display on the screen an indicator of the content of the memory location corresponding to the vertical segment below which the cursor is positioned. In this event, as shown in FIG. 20, the memory content signal MDO [12:1] on the twelve leads 76 (FIG. 6) is fed to a buffer circuit 294 (FIG. 20) and is clocked into the buffer 294 by gate cursor pulses GC. When the memory address corresponding to the location of the cursor is addressed, a gate cursor signal GC will be received by buffer 294, causing signal MDO [12:1] representing the content of the memory location corresponding to the cursor position to be received by buffer 294 and hence to be fed to another character generator circuit 296 of the same kind as character generator circuit 288. Circuit 296 (which again typically may contain an encoder to convert the binary signal to a form usable by its character generating chip) receives gating pulses G2 from gating signal generator 290, to produce an output character video signal CV2 which, when applied via lead 298 to the video summing circuit 129, will generate display 38 (FIG. 2) at the desired X and Y coordinates on the screen.

9. "OVERHEAD" CALCULATION

In many instances it is as previously discussed desirable to count the total number of input words sampled, and to count the total number of valid samples received (i.e. the number of samples within the range being sampled) and to compare the two quantities. This may be important when it is for example desired to determine how much time a supervisory program occupies during operation of the computer. In that case the range of valid samples may consist of all those input words used by the supervisory program.

Figure 21:
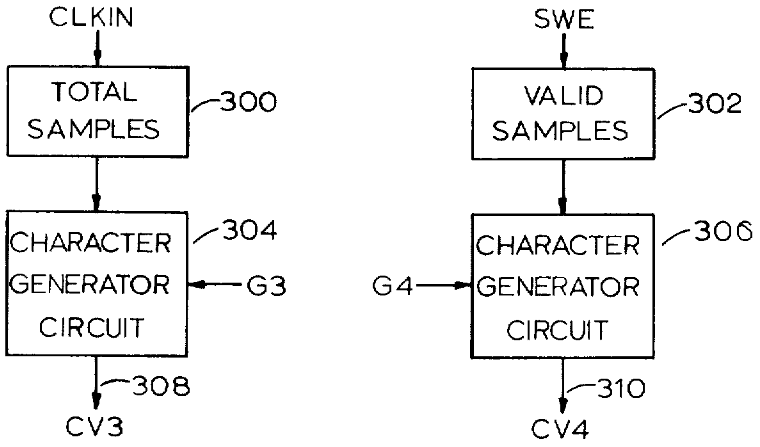
FIG. 21 is a block diagram showing means for monitoring the overhead of a computer.

For this purpose, as shown in FIG. 21, a total samples counter 300 is provided, stepped by pulses CLKIN which are used to clock data from the computer console 14 board into the input buffer 16 of FIG. 1. Each time an input word is sampled, the total samples counter is incremented by 1.

Similarly, and as also shown in FIG. 21, a valid samples counter 302 is provided, stepped by sample write enable pulses SWE derived from the sample control logic circuit 88 of FIG. 6. Each time a valid sample is received (i.e. a sample of value between the upper and lower boundaries set by the base address and resolution controls) the valid samples counter 302 is incremented by 1. The counts from counters 300, 302 are fed to character generating circuits 304, 306 of the same kind as character generating circuit 288, gated by gating pulses G3, G4 respectively from gating signal generator 290 (again so that the displays generated by character generator circuits 304, 306 will appear at the desired locations on the screen). The resulting character video signals CV3, CV4 are directed via leads 308, 310 to the video summing circuit 129 to produce displays 42, 44 respectively of FIG. 2. If desired, instead of displaying individually the total number of samples received and the total number of valid samples received, a single display can be provided showing the number of valid samples received as a percentage of the total number of samples. This percentage will under appropriate conditions be indicative of the overhead to the computer created by a particular supervisory or systems program.

If desired, a single character generating circuit can be used and gating circuits can be employed to gate data to it at the appropriate times to generate the displays 36, 38, 42, 44 on the monitor screen.

10. TIME HISTOGRAM

Figure 22:
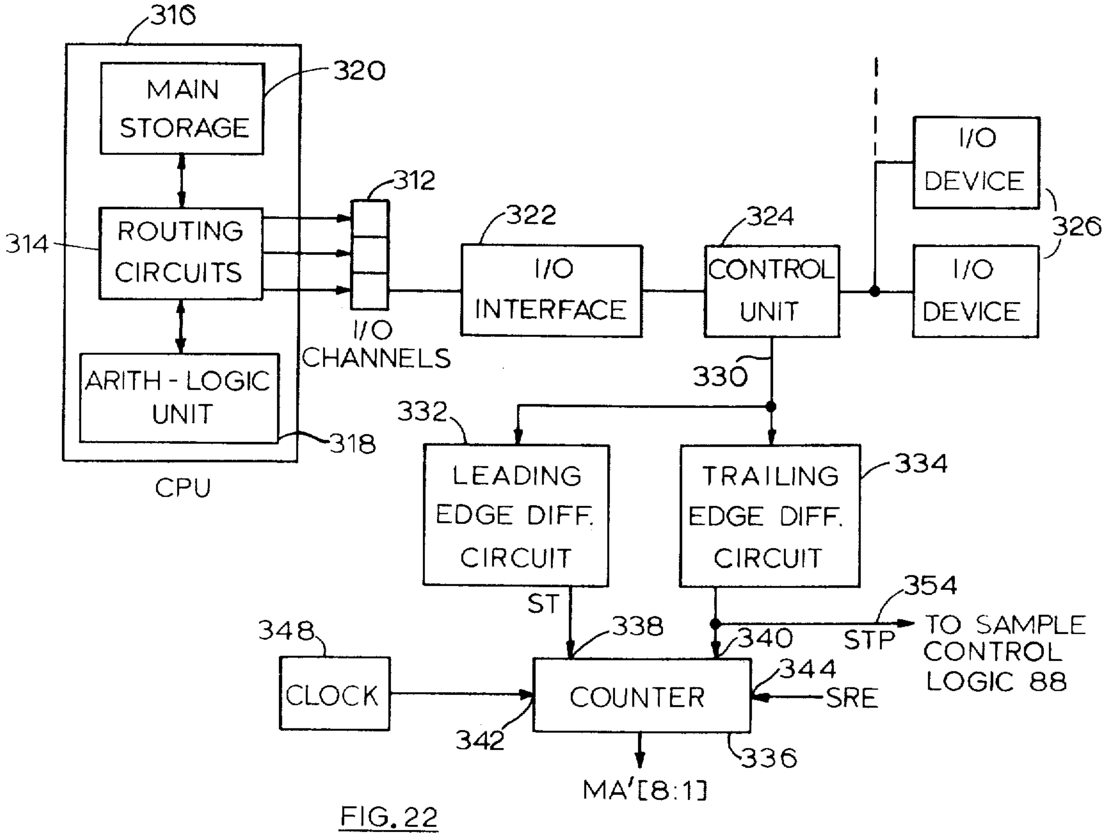
FIG. 22 is a block diagram showing means according to the invention for monitoring the times taken by input-output devices of a computer to transfer their data.

As previously stated, the invention can be used to monitor virtually any varying input quantity. One particularly useful application of the invention is to monitor times taken by input/output devices which deliver data to or receive data from a central processing unit. FIG. 22 illustrates the logical parts of a standard IBM System 360 input/output configuration, with a time monitoring system according to the invention connected thereto. FIG. 22 shows a set of input/output (I/O) multiplexor channels 312 connected via routing circuits 314 of a central processing unit (CPU) 316 to an arithmetic/logic unit 318 and to main storage 320 of the CPU.

Each of the I/O channels 312 is connected via an I/O interface 322 to one or more control units 324, the control units each being connected in turn to one or more input/output devices 326. The portion of FIG. 22 so far described is all entirely conventional.

It may sometimes occur that one of the I/O devices 326 malfunctions in that too much time is required to transfer data to or from it. This will prevent other I/O devices from transferring their data, and the CPU 316 may then suddenly cease operation and display a "data not available" indication. When this occurs, it is often extremely difficult to identify the problem as being a malfunctioning I/O device.

Figure 23:
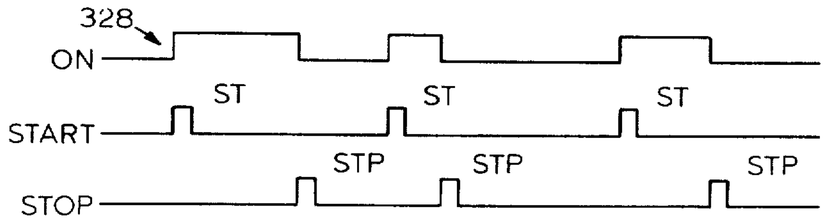
FIG. 23 is a timing diagram for the circuit of FIG. 22.

According to the invention, the time that is required by the various I/O devices for transfer of their data can readily be monitored. This may be accomplished as follows. Whenever an I/O device 326 is operating, its control unit 324 is "on" and produces an "on" signal shown at 328 in FIG. 23. This is conventional for most computers. The signal 328 is the signal to be monitored.

The signal 328 is directed via lead 330 to a leading edge differentiating circuit 332 and to a trailing edge differentiating circuit 334. The leading edge differentiating circuit 332 produces start pulses ST (FIG. 23) each time the signal being measured goes high, an the trailing edge differentiating circuit 334 produces a stop signal STP (FIG. 22) each time the signal being measured goes low.

The start signal ST and the stop signal STP are applied to a conventional counter 336 (FIG. 21) having a start terminal 338, a stop terminal 340, a clock input terminal 342, and a reset terminal 344. The clock input terminal 342 receives clock pulses from a clock 348 (FIG. 21). The clock pulses 346 typically have a 1 microsecond (u.s.) period. The counter reset terminal 344 receives sample read enable pulses SRE from the sample control logic circuit 88 of FIG. 6.

Thus, when a start pulse ST occurs, the counter 336 begins counting at the rate of one count each microsecond, being driven by the pulses from clock 348. When a stop signal STP occurs, the counter stops counting. The count in the counter is typically represented by an 8 bit output MA' [8:1] which is fed to the input buffer 16 as the least significant 8 bits of the input word (the reamining bits 22 to 9 in the buffer 16 are set at and remain zero). When sample pulses occur, the signal MA' [8:1] is clocked into the input buffer 16, and once this has occurred, the next pulse in the train produced by the sample control logic circuit 88, namely the sample read enable pulse SRE, is used to reset the counter 336 so that it can being counting again.

When the FIG. 22 circuit is used, the resolution and base address are both typically set at one. In this situation, each time "on" signal 328 occurs with 1 u.s. duration, memory address 0 will be incremented; each time "on" signal 328 occurs with a 2 u.s. duration, memory address 1 will be incremented, etc. If a period of "on" signal 328 is less than 1 u.s. then no memory address is incremented.

Figure 24:
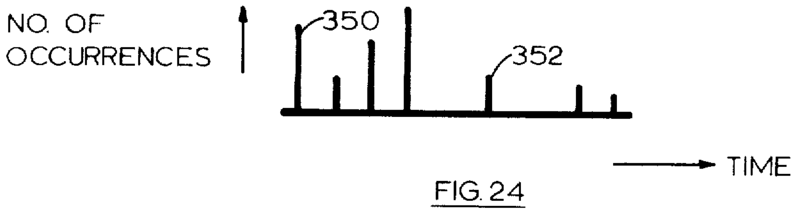
FIG. 24 shows a histogram produced with the circuit of FIG. 22.

A typical histogram produced by the invention when operating with input words determined by the counter 336 of FIG. 21 is shown in FIG. 24. Positions along the X-axis in FIG. 24 represent durations of "on" signal 328 and thus represent (for example) times of operation of I/O devices. For example, vertical segment 350 may indicate the number of times an I/O device has operated with a period of one microsecond, while vertical segment 352 may indicate the number of times an I/O device has operated with a period of 25 microseconds. It will be apparent that the presence of any vertical segments in the high time region, even if they are relatively small vertical segments, will be viewed with interest by a user.

When the FIG. 22 circuit is used, the stop pulses STP from circuit 334 are fed via lead 354 to switch 356 of the sample control logic circuit 88 of FIG. 6 and used as sample clock pulses, in place of pulses from the sample clock 90. This ensures that after the counter 336 has begun counting, no sample pulse will occur to clock its count Ma' [8:1 ] into the input buffer 16 until the counter has stopped counting (so that the complete count will be recorded). The reason for resetting the counter 336 with SRE pulses is that after the counter has counted the duration of a period of the "on" signal 328, the counter must not be reset and thus begin counting again until after the counter contents have been clocked into the input buffer 16.

When a counter 336 having an 8 bit output is employed, there is a one-to-one correspondence between the output of the counter and the memory addresses, and the counter 336 output can be used to address the memory 22 directly via the address and resolution registers 48, 50, of FIG. 3, the adder 52, multiplexor 60, and input validator 66 can all be eliminated, and the input valid and carry in inputs IV and CI to gate 102 (FIG. 6) of sample control logic circuit 88 can simply be set at 1's. If the counter 336 has an output of more than 8 bits (so it can measure more than 256 different durations), then these circuits will not be eliminated.

11. ANALOGUE INPUT DATA

Figure 25:
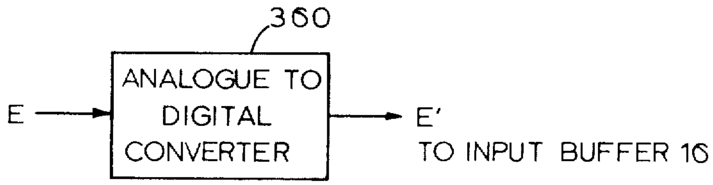
FIG. 25 shows an analogue to digital converter for converting analogue signals for use with the invention.

Although the invention has been described for use with a digital computer, the invention can as shown in FIG. 25 be used to sample any varying signal E, which may be derived from an analogue computer, or from a transducer measuring physical quantities (such as speed, direction, voltage, current, pressure, temperature or the like) or from any other type of instrument, provided that signal E is digitalized by feeding it into a conventional analogue to digital converter 360. This converts the analogue signal E to a digital signal E' of an appropriate number of bits. If signal E' has only 8 bits and if a 256 word memory 22 is used, then again the base number and resolution registers 48, 50, the adder 52, the multiplexor 60 and the input validator 66 of FIG. 3 can be eliminated and the signal E' can be used directly to address the memory, without need for defining a base number and resolution. If signal E' consists of more bits than can be used to address the memory, then the base number and resolution circuits previously described will preferably be used, to allow flexibility in examining the data.

12. OTHER VARIATIONS

Although only one television monitor has been described, it will be apparent that the histogram contained in the memory 22 can be sent to and displayed on any desired number of remote television monitors, so that if several persons are interested in monitoring the status of the computer, each can have his own monitor. If desired, each monitor can be fitted with controls so that each station can control the sampling and display procedures.

It will also be apparent that the sampling and monitoring apparatus of the invention can be directed from the computer itself. For example, a user can program the computer to direct the apparatus of the invention to start, take e.g. 100,000 samples, read the resulting histogram in the memory 22 onto a disc (instead of onto the monitor screen), clear itself, and take further sets of samples at periodic intervals and store the results on a disc for later analysis. The histograms stored on the disc can then later be read back into a memory such as memory 22 and displayed on the television monitor.

Although the histogram segments 32 of FIG. 2 are shown in vertical orientations, it will be apparent that the histogram segments can be displayed horizontally, either by turning the television tube through 90°, or by altering the counting circuits to address successive memory locations as the beam moves down the screen and by turning on the beam during horizontal scan lines for periods of time corresponding to the content of the memory location addressed, to produce horizontal segments.

Although the HD pulses have been described as typically being horizontal blanking pulses, they could be other pulses synchronized with and having the same frequency as the horizontal blanking pulses. For example, as previously mentioned, it has been found that HD pulses corresponding to the horizontal blanking pulses but without the back porch interval perform well. Alternatively the HD pulses could be pulses of longer period than the horizontal blanking pulses (this would reduce the number of counts in each horizontal line), or they could be horizontal sync pulses (but in that case since additional counting would occur while the screen is blanked, some information could be lost). Similarly the VD pulses need not be vertical blanking pulses; they could for example be other pulses synchronized with and of the same frequency as the vertical blanking pulses and having a generally similar period. In fact, the VD pulses can be vertical sync pulses, although the Y-axis counter would then count those horizontal pulses which follow the second set of equalizing pulses and which occur prior to termination of the vertical blanking pulse, and this would displace the display upwardly on the screen unless appropriate adjustment is made (e.g. by subtracting an appropriate number greater than 16 in adder 203 of FIG. 14).

What I claim is:

1. A monitoring device for generating a histogram from a varying digital input word, said device comprising:

1. an input buffer,
2. means for periodically gating said input word into said input buffer,
3. a memory having a predetermined number of addresses,
4. means connected to said input buffer for computing a said address in said memory for each input word in a selected range of input words, so that a said address is associated with each input word in said range,
5. and means connected to said means (4) for incrementing a said memory address by a constant quantity each time an input word associated with such address is received in said input buffer, whereby the total content of each memory address is representative of the total number of occurrences of all the input words associated with such memory address.

2. A monitoring device according to claim 1 wherein said means (4) includes adjustable limit means for setting adjustable upper and lower boundaries for said range, said limit means including resolution means dividing the data words between said boundaries into a number of groups, the number of said groups being equal to said predetermined number, one group associated with each memory address, whereby the number of data words in each group is the resolution of said device.

3. A monitoring device according to claim 2 wherein said limit means includes base number means for setting a lower boundary for said range, and wherein said means for setting said upper boundary is constituted by said base number means and said resolution means together.

4. A monitoring device according to claim 3 wherein said input buffer is a binary register containing said input word as a binary word of M bits, said memory addresses being expressable as binary words of not more than N bits, where N is less than M, said base address means including a base address register containing said base address as a binary word of M bits, means for loading a selected base address into said base address register, said resolution means including a resolution register containing a binary word representative of said resolution, means for loading a resolution value equal to $2^p$ into said resolution register, where $p$ is a number between 0 and M-N and each resolution is double the next smaller resolution, said means (4) including means for subtracting said base address from said input word to produce a modified input word of M bits, said means (4) further including multiplexor means for receiving said modified input word and for receiving said binary word representative of said resolution and for computing a said memory address of N bits therefrom by selecting the N rightmost bits of said modified input word commencing at bit $p + N$ and ending at bit $p + 1$ inclusive.

5. A monitoring device according to claim 1 including a television monitor having a screen, and display circuit means for displaying on said screen the content of a selected group of said memory addresses as a series of parallel segments, one segment for each memory address, spaced apart on said screen with the magnitude of each segment being representative of the content of the memory address corresponding thereto.

6. A monitoring device according to claim 2 including a first counter, and means connecting said first counter to record the total number of input words gated into said input buffer, a second counter, and means connecting said second counter to record the number of input words received in said range, whereby the number of words received in said range can be compared with the total number of input words received.

7. A monitoring device according to claim 2 including a television monitor having a screen, display circuit means for displaying on said screen the content of a selected group of said memory addresses as a series of parallel segments, one segment for each memory address, spaced apart on said screen with the magnitude of each segment being representative of the content of the memory address corresponding thereto, said device further including cursor generating means for generating on said screen a cursor movable to point to a selected segment, and means connected to said cursor generating means and to said display circuit means for identifying the memory address associated with the segment pointed to by said cursor, said device further including calculating means for computing from such memory address the input word or range of words associated with such memory address.

8. A monitoring device according to claim 7 including character generating means coupled to said calculating means for generating on said screen a character display indicative of the value of the input word or range of input words associated with the vertical segment pointed to by said cursor.

9. A monitoring device according to claim 7 including readout means for reading the content of the memory address of the segment pointed to by said cursor, and character generating means coupled to said readout means for generating on said screen a character display indicative of the content of the memory address associated with the segment pointed to by said cursor.

10. A monitoring device according to claim 7 wherein said memory addresses in said selected group are numbered in sequence and are fewer in number than said predetermined number, said device including means for sequentially changing the memory address associated with each segment from a first memory address to a second memory address, said second memory address differing by one memory address from said first memory address, so that said segments together may represent sequentially the contents of all said addresses of said memory, and whereby said segments appear to move across said screen from one side to the other.

11. A monitoring device according to claim 7 wherein said display circuit means includes:

6. a synchronizing pulse generating circuit for generating horizontal and vertical sync pulses to control the scan of the beam of said monitor, and for supplying horizontal and vertical drive pulses synchronized with and having the same frequency as said horizontal and vertical sync pulses respectively,
7. an X-axis position counter connected to said synchronizing pulse generating circuit for receiving said horizontal drive pulses and for producing a series of counts indicative of the X-axis position of said beam, and means for resetting said X-axis position counter to an initial count at the commencement of each horizontal scan line of said beam,
8. a Y-axis position counter connected to said synchronizing pulse generating circuit for receiving said horizontal drive pulses and for producing a series of counts indicative of the Y-axis position of said beam, and means responsive to said vertical drive pulses for resetting said Y-axis position counter to an initial count at the commencement of each field,
9. means connecting one of said counters to said memory to address successive memory locations therein, so that each addressed memory location is associated with a discrete location of said beam along one of said axes,
10. comparison means connected to said memory, and means for successively reading the content of addressed memory locations into said comparison means as such locations are addressed,
11. said comparison means including means connected to the other of said counters for comparing the content of such read-out memory location with the count of said other counter and for producing a visible mark on said screen when the content of such read-out memory location bears a selected relation to the count of said other counter, whereby to generate said series of spaced parallel segments on said screen, each segment representing the content of a separate one of said addressed memory locations.

12. A monitoring device according to claim 11 and including crawl counter means connected to said one counter for incrementing said initial count in said one counter by one at selected intervals, whereby to cause said segments on said screen to appear to shift sideways.

13. A monitoring device according to claim 3 and including a television monitor having a screen, said device further including synchronizing and display circuit means connected between said memory and said monitor for displaying at least a portion of the contents of said memory as a histogram of vertical segments spaced across said screen, said synchronizing and display circuits including:

6. a synchronizing pulse generating circuit for generating horizontal and vertical sync pulses to control the scan of the beam of said monitor, and for supplying horizontal and vertical drive pulses synchronized with and having the same frequency as said horizontal and vertical sync pulses respectively,
7. a dynamic X-axis position counter operative to produce a series of counts corresponding to respective memory addresses in said memory,
8. means coupled to said dynamic X-axis position counter and responsive to said horizontal drive pulses for setting said dynamic X-axis position counter to an initial count substantially at the commencement of each horizontal scan line of said beam and for driving said dynamic X-axis position counter to count as said beam scans along the X-axis of said screen,
9. means connecting said dynamic X-axis position counter to said memory for said dynamic X-axis position counter to address successive memory locations corresponding to successive counts of said counter, so that each addressed memory location is associated with a discrete X-axis location of said beam,
10. a Y-axis position counter, and means coupled to said Y-axis position counter and responsive to said horizontal and vertical drive pulses for setting said Y-axis position counter to an initial count substantially at the commencement of each field and for driving said Y-axis position counter to count each horizontal line in such field, so that the count in said Y-axis position counter represents the Y-axis position of said beam,
11. means for determining a base Y-axis position of said beam on said screen,
12. comparison means having a first input for receiving counts from said Y-axis position counter and a second input for receiving data from said memory,
13. means associated with said dynamic X-axis position counter and connected to said memory for effecting successive read-outs of the content of the successive memory locations addressed by said dynamic X-axis position counter into said second input of said comparison means,
14. said comparison means including means for comparing the content of each such read-out memory location with the count of said Y-axis position counter and for causing said beam to generate a visual dot on said screen at the beam X-axis position associated with such read-out location of the content of said memory for such read-out location exceeds the difference between the Y-axis position of said beam and said base position, such dot thereby forming a portion of the segment associated with such read-out memory location.

14. A monitoring device according to claim 13 and including crawl counter means coupled to said means (8) and responsive to said vertical drive pulses for incrementing said initial count of said dynamic X-axis position counter by one upon receipt of each vertical drive pulse by said crawl counter means, whereby the memory address associated with each X-axis position of said beam is incremented by one, thereby causing said histogram to appear to move to the left on said screen.

15. A monitoring device according to claim 14 including cursor generating means for generating on said screen a cursor to point to a selected segment, said cursor generating means including a. a cursor position counter, and means for loading a selected count into said cursor position counter, said selected count representing the memory address for the vertical segment to which said cursor is to point,
b. a cursor position decoder, means connecting said cursor position decoder to said cursor position counter to receive said selected count therefrom, and means connecting said cursor position decoder to said dynamic X-axis counter to receive counts therefrom,
c. said cursor position decoder including means for comparing the counts received from said cursor position counter and from said dynamic X-axis counter and for producing pulses only when said counts are equal, said pulses thereby occurring at the X-axis position of the vertical segment to which said cursor is to point,
d. and video generating means for receiving said pulses from said cursor position decoder and for generating therefrom a vertical cursor line on said screen, below said Y-axis of said beam, as an extension of the vertical segment to which said cursor is to point, such vertical line constituting said cursor.

16. A monitoring device according to claim 15 including means for incrementing and decrementing said selected count in said cursor position counter, whereby to shift the position of said cursor.

17. A monitoring device according to claim 15 including means for incrementing said selected count in said cursor position counter by one each time said initial count in said dynamic X-axis position counter is incremented by one, whereby to maintain said cursor motionless on said screen as said display shifts to the left on said screen.

18. A display device including a television monitor having a screen, for displaying on said screen a histogram representing the content of a selected group of locations of a memory, said memory having a predetermined number of locations, said display device comprising:

1. a synchronizing pulse generating circuit for generating horizontal and vertical sync pulses to control the scan of the beam of said monitor, and for supplying horizontal and vertical drive pulses synchronized with and having the same frequency as said horizontal and vertical sync pulses respectively,
2. an X-axis position counter connected to said synchronizing pulse generating circuit for receiving said horizontal drive pulses and for producing a series of counts indicative of the X-axis position of said beam, and means for resetting said X-axis position counter to an initial count at the commencement of each horizontal scan line of said beam, 3. a Y-axis position counter connected to said synchronizing pulse generating circuit for receiving said horizontal drive pulses and for producing a series of counts indicative of the Y-axis position of said beam, and means responsive to said vertical drive pulses for resetting said Y-axis position counter to an initial count at the commencement of each field, 4. means connecting one of said counters to said memory to address successive memory locations therein, so that each addressed memory location is associated with a discrete location of said beam along one of said axes, 5. comparison means connected to said memory, and means for successively reading the content of addressed memory locations into said comparison means as such locations are addressed, 6. said comparison means including means connected to the other of said counters for comparing the content of such read-out memory location with the count of said other counter and for producing a visible mark on said screen when the content of such read-out memory location bears a selected relation to the count of said other counter, whereby to generate a series of spaced parallel segments on said screen, each segment representing the content of a separate one of said addressed memory locations.

19. A display device according to claim 18 and including cursor generating means for generating on said screen a cursor to point to a selected segment, said cursor generating means including a. a cursor position counter, and means for loading a selected count into said cursor position counter, said selected count representing the memory address for the vertical segment to which said cursor is to point, b. a cursor position decoder, means connecting said cursor position decoder to said cursor position counter to receive said selected count therefrom, and means connecting said cursor position decoder to said one counter to receive counts therefrom, c. said cursor position decoder including means for comparing the counts received from said cursor position counter and from said one counter and for producing pulses only when said counts are equal, d. and video geneating means for receiving said pulses from said cursor position decoder and for generating therefrom a line on said screen as an extension of the segment to which said cursor is to point, such extension constituting said cursor.

20. A display device according to claim 19 including means for incrementing and decrementing said selected count in said cursor position counter, whereby to shift the position of said cursor.

21. A display device according to claim 20 and including crawl counter means connected to said one counter for incrementing said initial count in said one counter by one at selected intervals, whereby to cause said segments on said screen to appear to shift sideways.

22. A display device according to claim 21 including means for incrementing said selected count in said cursor position decoder by one each time said initial count in said one counter is incremented by one, whereby to maintain said cursor motionless on said screen as said display is shifted on said screen.

* * * * *